(12) United States Patent
Tsukitani et al.

(10) Patent No.: US 7,194,171 B2
(45) Date of Patent: *Mar. 20, 2007

(54) DISPERSION COMPENSATING OPTICAL FIBER, DISPERSION COMPENSATING DEVICE, OPTICAL TRANSMISSION LINE AND OPTICAL TRANSMISSION SYSTEM

(75) Inventors: Masao Tsukitani, Yokohama (JP); Eisuke Sasaoka, Yokohama (JP); Eiji Yanada, Yokohama (JP); Yuichi Ohga, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,606

(22) Filed: Mar. 31, 2003

(65) Prior Publication Data

US 2003/0156809 A1    Aug. 21, 2003

Related U.S. Application Data

(63) Continuation-in-part of application No. 10/269,086, filed on Oct. 11, 2002, which is a continuation-in-part of application No. 09/618,752, filed on Jul. 18, 2000, now Pat. No. 6,466,721.

(30) Foreign Application Priority Data

| | | | |
|---|---|---|---|
| Jul. 19, 1999 | (JP) | | P1999-205002 |
| Jul. 19, 1999 | (JP) | | P1999-205010 |
| Jun. 2, 2000 | (JP) | | P2000-166298 |

(51) Int. Cl.
*G02B 6/02* (2006.01)

(52) U.S. Cl. ............................................. 385/123
(58) Field of Classification Search ................. 398/81, 398/147, 27, 148, 119, 29, 86; 385/123–128
See application file for complete search history.

(56) References Cited

U.S. PATENT DOCUMENTS 5,361,319 A    11/1994    Antos et al.

(Continued)

FOREIGN PATENT DOCUMENTS

FR    2761483    10/1998

(Continued)

OTHER PUBLICATIONS

G.E. Berkey et al., "*Negative Slope Dispersion Compensating Fibers*", Science and Technology Division.

(Continued)

*Primary Examiner*—Daniel Walsh
(74) *Attorney, Agent, or Firm*—McDermott Will & Emery LLP

(57) ABSTRACT

A dispersion compensating optical fiber comprises a minimum wavelength at which an increase amount of an actual loss value with respect to a theoretical loss value is not less than 10 mdB/km in a use wavelength band and on a long wavelength side of the use wavelength band. The actual loss value is measured in a state that the fiber is looped around a bobbin. The minimum wavelength falls within a range of 1,565 to 1,700 nm. This dispersion compensating optical fiber is suitably used for an optical transmission line of a large-capacity high-speed WDM optical transmission system.

15 Claims, 23 Drawing Sheets

U.S. PATENT DOCUMENTS

| | | | |
|---|---|---|---|
| 5,555,340 A | 9/1996 | Onishi et al. | |
| 5,673,354 A * | 9/1997 | Akasaka et al. | 385/127 |
| 5,732,178 A * | 3/1998 | Terasawa et al. | 385/127 |
| 5,742,723 A * | 4/1998 | Onishi et al. | 385/127 |
| 5,838,867 A * | 11/1998 | Onishi et al. | 385/123 |
| 6,301,419 B1 | 10/2001 | Tsukitani et al. | |
| 6,466,721 B1 * | 10/2002 | Tsukitani et al. | 385/127 |
| 6,470,126 B1 * | 10/2002 | Mukasa | 385/123 |
| 6,614,515 B2 * | 9/2003 | Fayer et al. | 356/73.1 |
| 6,654,531 B2 * | 11/2003 | Gruner-Nielsen et al. | 385/123 |
| 6,707,976 B1 * | 3/2004 | Gruner-Nielsen et al. | 385/123 |
| 6,724,956 B2 * | 4/2004 | Edvold et al. | 385/24 |
| 2001/0033724 A1 * | 10/2001 | Kato et al. | 385/123 |
| 2002/0001444 A1 * | 1/2002 | Hirano et al. | 385/123 |
| 2002/0090186 A1 * | 7/2002 | Sillard et al. | 385/123 |
| 2002/0164138 A1 * | 11/2002 | Saitou et al. | 385/127 |
| 2003/0053777 A1 * | 3/2003 | Fujii et al. | 385/123 |
| 2003/0086671 A1 * | 5/2003 | Tsukitani et al. | 385/123 |
| 2003/0103748 A1 * | 6/2003 | Hirano et al. | 385/124 |
| 2003/0156809 A1 * | 8/2003 | Tsukitani et al. | 385/123 |
| 2003/0190118 A1 * | 10/2003 | Edvold et al. | 385/24 |
| 2004/0005130 A1 * | 1/2004 | Yamamoto et al. | 385/123 |
| 2004/0047574 A1 * | 3/2004 | Rathje | 385/123 |
| 2004/0105638 A1 * | 6/2004 | Sillard et al. | 385/123 |
| 2004/0114897 A1 * | 6/2004 | Koshiba et al. | 385/123 |

FOREIGN PATENT DOCUMENTS

| | | | |
|---|---|---|---|
| JP | 6-345494 | | 12/1994 |
| JP | 9-127354 | | 5/1997 |
| JP | 2001091781 | * | 4/2004 |

OTHER PUBLICATIONS

Kazunori Mukasa et al., "*Novel Network Fiber to Manage Dispersion at 1.55 μm with Combination of 1.3 μm Zero Dispersion Single Mode Fiber*", Conference Publication No. 448, Sep. 22-25, 1997, pp. 127-130.

M. Murakami et al., "*Quarter Terabit (25×10Gb/s) Over 9288 km WDM Transmission Experiment using Nonlinear Supported RZ Pulse in Higher Order Fiber Dispersion Managed Line*".

A. Boskovic et al. "*Measurement of Nonlinear Refractive Index $n_2$ of Dispersion Compensating Fibres*",22nd European Conference on Optical Communication, ECOC '96, pp. 249-252.

Himeno K et al., "Splice Loss of Large Effective Area Fiber And Its Reduction By Mode Field Conversion." IOOC-ECOC 1997, 11th International Conference on Integrateed Optics and Optical Fibre Communications, 23rd European Conference on Optical Communications. Edinburgh, Sep. 22-25, 1997, IEE Conference Publication, London: IEE, UK, vol. 1 No. 448, Sep. 1997, pp. 131-134m XP002932573, ISBN: 0-85296-697-0.

* cited by examiner

DISPERSION COMPENSATING OPTICAL FIBER, DISPERSION COMPENSATING DEVICE, OPTICAL TRANSMISSION LINE AND OPTICAL TRANSMISSION SYSTEM

RELATED APPLICATIONS

This is a Continuation-in-Part application of a Continuation-in-Part application Ser. No. 10/269,086 filed on Oct. 11, 2002 from U.S. patent application Ser. No. 09/618,752 filed on Jul. 18, 2000, now U.S. Pat. No. 6,466,721.

BACKGROUND OF THE INVENTION

1. Field of the Invention

The present invention relates to an optical transmission line suitably used for a large-capacity high-speed WDM optical transmission system, and an optical fiber and a dispersion compensating device suitably used for such an optical transmission line.

2. Related Background Art

An optical transmission system employing the WDM (Wavelength Division Multiplexing) scheme transmits a wavelength-multiplexed optical signal in the 1.55-μm wavelength band through an optical fiber transmission network and enables large-capacity high-speed communication. This optical transmission system is constructed by an optical fiber transmission line as an optical signal transmission medium, an optical amplifier for amplifying a wavelength-multiplexed optical signal at once, and the like. Various researches and developments have been made to enable larger-capacity higher-speed WDM communication.

For an optical transmission line, reduction of dispersion and a dispersion slope is an important subject of study. More specifically, when an optical transmission line has dispersion in the wavelength band of an optical signal, the waveform of optical signal sent from the transmitting station deforms through the optical transmission line to cause reception degradation at the receiving station, because the optical signal has a certain bandwidth though the signal is monochromatic. Hence, dispersion in optical transmission line is preferably as small as possible in the signal wavelength band. For large-capacity communication, dispersion in optical transmission line is desirably small in a signal wavelength band as wide as possible. Hence, the dispersion slope in the optical transmission line is also preferably as small as possible.

SUMMARY OF THE INVENTION

Studies have been made to almost nullify both dispersion and a dispersion slope in an optical transmission line in the 1.55-μm wavelength band. More specifically, a single-mode optical fiber having positive dispersion and positive dispersion slope at the wavelength of 1,550 nm and a dispersion compensating optical fiber having negative dispersion and a negative dispersion slope at the wavelength of 1,550 nm are connected and constructed as an optical transmission line, thereby almost nullifying both dispersion and a dispersion slope as a whole in the 1.55-μm wavelength band for the optical transmission line. The present inventor, however, has found that the above-described optical transmission line formed by connecting an existing dispersion compensating optical fiber to a single-mode optical fiber is not always preferable for actual construction from the viewpoint of transmission loss and nonlinear optical phenomenon.

The present invention has been made to solve the above problem, and has as its object to provide a dispersion compensating optical fiber and a dispersion compensating device which has a small average transmission loss and can suppress a nonlinear optical phenomenon for an entire optical transmission line when connected to a single-mode optical fiber to form the optical transmission line, and an optical transmission line and an optical transmission system having such a dispersion compensating optical fiber.

A dispersion compensating optical fiber according to the present invention comprises a minimum wavelength (to be referred to as a "leading wavelength" hereinafter) at which an increase amount of an actual loss value with respect to a theoretical loss value is not less than 10 mdB/km in a use wavelength band and on a long wavelength side of the use wavelength band. The actual loss value is measured in a state that the fiber is looped around a bobbin, and the minimum wavelength falls within a range of 1,565 to 1,700 nm.

A dispersion compensating optical fiber according to the present invention comprises a minimum wavelength at which an increase amount of an actual loss value with respect to a theoretical loss value is not less than 10 mdB/km in a use wavelength band and on a long wavelength side of the use wavelength band. The actual loss value is measured in a state that the fiber is comprised in an optical module, and the minimum wavelength falls within a range of 1,565 to 1,700 nm.

A dispersion compensating optical fiber according to the present invention comprises a minimum wavelength at which an increase amount of an actual loss value with respect to a theoretical loss value is not less than 10 mdB/km in a use wavelength band and on a long wavelength side of the use wavelength band. The actual loss value is measured in a state that the fiber is comprised in an optical cable, and the minimum wavelength falls within a range of 1,565 to 1,700 nm.

A dispersion compensating optical fiber according to the present invention comprises relative dispersion slope of 0.0023 to 0.0043 $mm^{-1}$ at a wavelength of 1,550 nm and a minimum wavelength at which an increase amount of an actual loss value with respect to a theoretical loss value is not less than 10 mdB/km in a use wavelength band and on a long wavelength side of the use wavelength band. The minimum wavelength falls within a range of 1,565 to 1,700 nm.

In a fiber according to the present invention, the actual loss value is measured in a state that the fiber is looped around a bobbin or in a state that the fiber is comprised in an optical cable.

In a fiber according to the present invention, a dispersion value at a wavelength of 1,550 nm is −82 to −29 ps/nm/km.

A dispersion compensating optical fiber according to the present invention comprises relative dispersion slope of not less than 0.006 $nm^{-1}$ at a wavelength of 1,550 nm and a minimum wavelength at which an increase amount of an actual loss value with respect to a theoretical loss value is not less than 10 mdB/km in a use wavelength band and on a long wavelength side of the use wavelength band. The minimum wavelength falls within a range of 1,565 to 1,700 nm.

In a fiber according to the present invention, the actual loss value is measured in a state that the fiber is looped around a bobbin or in a state that the fiber is comprised in an optical module.

A dispersion compensating device according to the present invention comprises a plurality of optical fibers. The fibers are optically connected. At least one of the fibers is a dispersion compensating optical fiber. A minimum wavelength at which an increase amount of an actual loss value with respect to a theoretical loss value for the fibers as a whole is not less than 10 mdB/km in a use wavelength band and on a long wavelength side of the use wavelength band falls within a range of 1,565 to 1,700 nm.

In a device according to the present invention, relative dispersion slope at a wavelength of 1,550 nm is not less than 0.006 nm$^{-1}$.

In a device according to the present invention, the actual loss value is measured in a state that the device is comprised in an optical module.

Each of a dispersion compensating optical fiber and a dispersion compensating device described above has a small actual loss value. Each of the fiber and the device forms an optical transmission line with a single-mode optical fiber and compensates dispersion. Both the average transmission loss and nonlinear index of such an optical transmission line as a whole is sufficiently small.

If the use wavelength band is the C band (1,520 to 1,565 nm), the leading wavelengths of the dispersion compensating optical fiber and the dispersion compensating device preferably fall within the range of 1,565 to 1,700 nm. If the use wavelength band includes not only the C band but also the L band (1,565 to 1,620 nm), the leading wavelengths of the dispersion compensating optical fiber and the dispersion compensating device preferably fall within the range of 1,620 to 1,700 nm.

Further, since a dispersion compensating device described above is formed by optically connecting a plurality of optical fibers, large relative dispersion slope (RDS: dispersion slope/dispersion) can be easily obtained.

An optical transmission line according to the present invention is formed by optically connecting a single-mode optical fiber having positive dispersion and positive dispersion slope at a wavelength of 1,550 nm and the dispersion compensating optical fiber according to the present invention.

An optical transmission line according to the present invention is formed by optically connecting a single-mode optical fiber having positive dispersion and positive dispersion slope at a wavelength of 1,550 nm and the dispersion compensating device according to the present invention.

An optical transmission system according to the present invention comprises the optical transmission line according to the present invention.

The present invention will become more fully understood from the detailed description given hereinbelow and the accompanying drawings. They are given by way of illustration only, and thus should not be considered limitative of the present invention.

DETAILED DESCRIPTION OF THE PREFERRED EMBODIMENT

Figure 1:
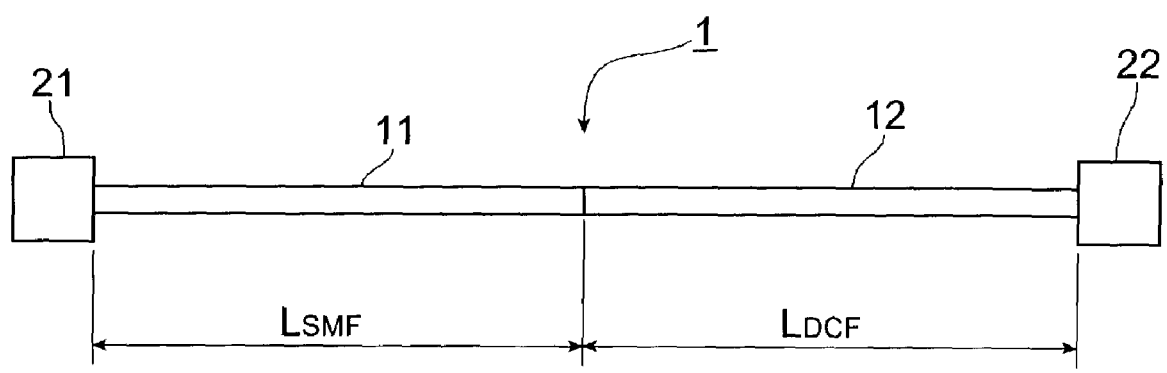
FIG. 1 is a view showing the arrangement of an optical transmission line and an optical transmission system according to an embodiment.

An embodiment of the present invention will be described below with reference to the accompanying drawings. The same reference numerals denote the same elements throughout the drawings, and a detailed description thereof will be omitted.

FIG. 1 is a view showing the arrangement of an optical transmission line 1 according to this embodiment. The optical transmission line 1 of this embodiment is formed by connecting an upstream single-mode optical fiber (SMF) 11 to a downstream dispersion compensating optical fiber (DCF) 12, and provided between a repeater 21 and a repeater 22, thus an optical transmission system is constructed. At least one of the repeaters 21 and 22 may be a station. The single-mode optical fiber 11 has a zero dispersion wavelength in the 1.3-μm wavelength (1250 nm to 1350 nm) band and positive dispersion and a positive dispersion slope at a wavelength of 1,550 nm. The dispersion compensating optical fiber 12 has negative dispersion and a negative dispersion slope at the wavelength of 1,550 nm. The dispersion compensating optical fiber 12 can be comprised in an optical cable or in an optical module. A wavelength-multiplexed optical signal in the 1.55-μm wavelength band, which is output from the repeater 21 sequentially propagates through the single-mode optical fiber 11 and dispersion compensating optical fiber 12 and reaches the repeater 22.

For the single-mode optical fiber 11, let $L_{SMF}$ be the length, $D_{SMF}$ (unit: ps/nm/km) be the dispersion value at the wavelength of 1,550 nm, and $S_{SMF}$ (unit: ps/nm$^2$/km) be the dispersion slope at the wavelength of 1,550 nm. For the dispersion compensating optical fiber 12, let $L_{DCF}$ be the length, $D_{DCF}$ (unit: ps/nm/km) be the dispersion value at the wavelength of 1,550 nm, and $S_{DCF}$ (unit: ps/nm$^2$/km) be the dispersion slope at the wavelength of 1,550 nm. For the entire optical transmission line 1, let $D_{total}$ (unit: ps/nm/km) be the average dispersion value at the wavelength of 1,550 nm, and $S_{total}$ (unit: ps/nm$^2$/km) be the average dispersion slope at the wavelength of 1,550 nm. A DCF ratio R representing the ratio of the length of dispersion compensating optical fiber 12 to the length of entire optical transmission line 1 is defined by $$R = L_{DCF}/(L_{DCF}+L_{SMF}) \quad (1)$$

At this time, $$D_{total} = R \cdot D_{DCF} + (1-R) \cdot D_{SMF} \quad (2a)$$

$$S_{total} = R \cdot S_{DCF} + (1-R) \cdot S_{SMF} \quad (2b)$$

In the optical transmission line 1 of this embodiment, the value of DCF ratio R ranges from 0.2 to 0.4.

For the single-mode optical fiber 11, the dispersion value $D_{SMF}$ is about 17 to 19 ps/nm/km, and the dispersion slope $S_{SMF}$ is about 0.05 to 0.06 ps/nm$^2$/km. In the single-mode optical fiber 11, the core region may be made of GeO$_2$-doped silica while the cladding region may be made of pure silica, or the core region may be made of pure silica while the cladding region may be formed from F-doped silica. However, the single-mode optical fiber 11 is preferably a pure silica core fiber having a core region formed from pure silica which is not intentionally doped with an impurity such as GeO$_2$. In this case, the loss in the entire optical transmission line 1 can be reduced by decreasing the Rayleigh scattering coefficient. As a result, degradation in waveform due to the nonlinear effect can be suppressed by reducing light incident power.

Figure 2A:
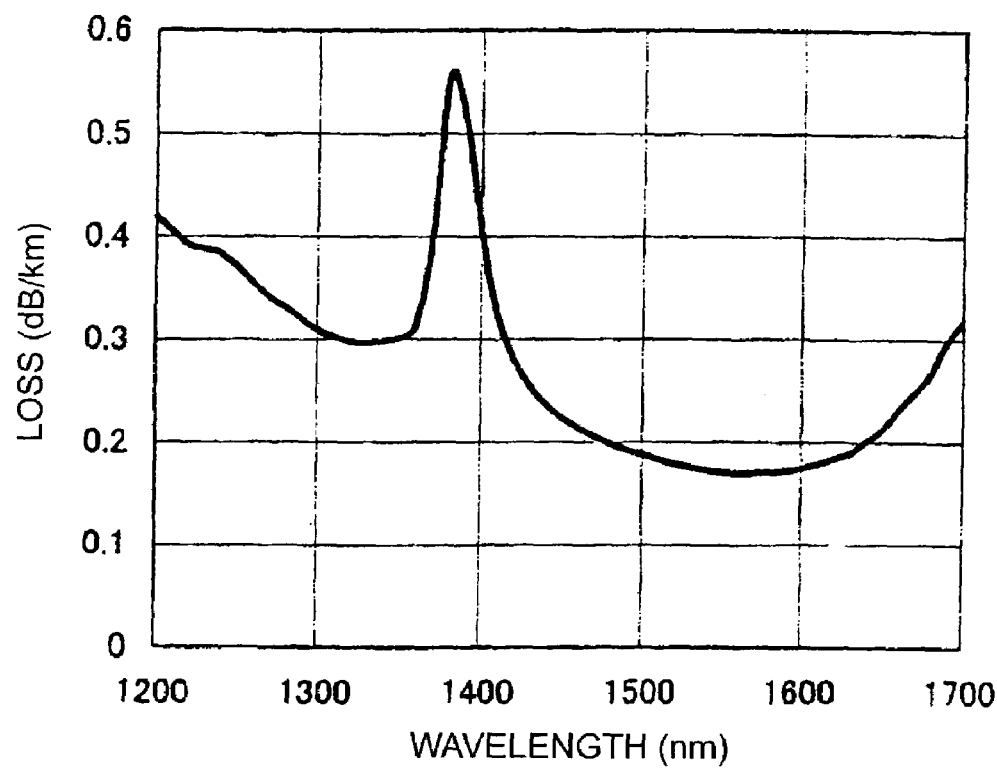
FIG. 2A is a graph showing a specific example of the relationship between transmission loss of a pure silica core fiber and the wavelength of propagation light.
Figure 2B:
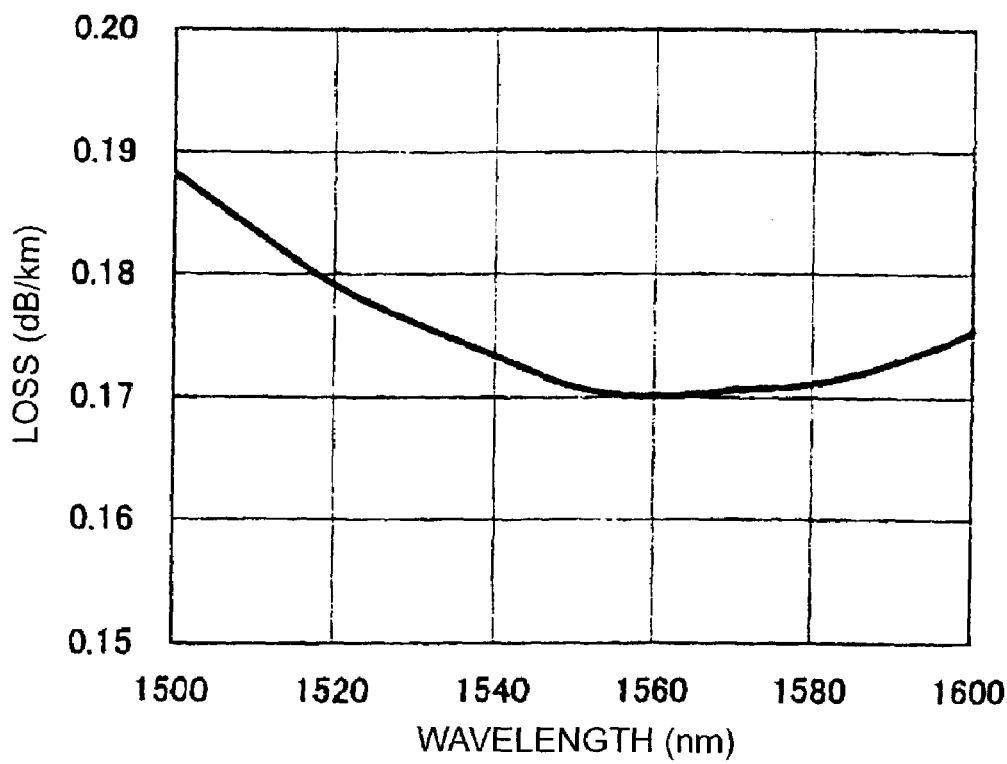
FIG. 2B is a graph showing the magnification of the part of FIG. 2A.

FIG. 2A is a graph showing a specific example of the relationship between transmisson loss of a pure silica core fiber and the wavelength of propagation light. FIG. 2B is a graph showing the magnification of the part of FIG. 2A. As shown in FIGS. 2A and 2B, transmission loss at the wavelength of 1,550 nm is preferably not more than 0.18 dB/km.

The single-mode optical fiber 11 preferably has an effective area $A_{eff}$ of 100 μm$^2$ or more at the wavelength of 1,550 nm. In this case, the power density of propagation light can be suppressed, and degradation in waveform due to the nonlinear effect can be suppressed.

Table 1 shows the comparison result of loss and nonlinearity between four types of single-mode optical fibers 11: a normal single-mode optical fiber (GeSM) having a core region doped with GeO$_2$, a normal pure silica core fiber (PSCF), an $A_{eff}$-increased GeSM having an increased effective area, and an $A_{eff}$-increased PSCF having an increased effective area.

TABLE 1

| | Single-Mode Optical Fiber (SMF) | | | | Span Between Repeaters |
|---|---|---|---|---|---|
| | Loss [dB/km] | Dispersion $D_{SMF}$ [ps/nm/km] | Effective area $A_{eff}$ [μm$^2$] | Nonlinear Refractive Index $n_{NL}$ [×10$^{-20}$ m$^2$/W] | Equivalent Effective area Equivalent $A_{eff}$ [μm$^2$] |
| GeSM | 0.185 | 17 | 80 | 3.0 | 50.7 |
| PSCF | 0.170 | 18 | 80 | 2.8 | 53.4 |
| $A_{eff}$-Increased GeSM | 0.185 | 17 | 100 | 3.0 | 57.4 |
| $A_{eff}$-Increased PSCF | 0.170 | 18 | 100 | 2.8 | 59.4 |

To calculate an equivalent effective area (equivalent $A_{eff}$) in Table 1, an optical fiber having a loss of 0.270 dB/km, dispersion value $D_{DCF}$ of −39.2 ps/nm/km, dispersion slope $S_{DCF}$ of −0.060 ps/nm$^2$/km, effective area $A_{eff}$ of 20.63 μm, and nonlinear refractive index $n_{NL}$ of 3.82×10$^{-20}$ m$^2$/W was used as the dispersion compensating optical fiber 12.

As shown in Table 1, When the GeSM is changed to the PSCF, the equivalent $A_{eff}$ can be increased by about 5%. In addition, when an optical fiber with increased $A_{eff}$ is used, the equivalent $A_{eff}$ can be further increased by about 10%. Hence, when the PSCF with increased $A_{eff}$ is used as the single-mode optical fiber 11, the nonlinearity of the optical transmission line 1 can be effectively reduced.

On the other hand, the dispersion compensating optical fiber 12 according to this embodiment has the dispersion value $D_{DCF}$ and dispersion slope $S_{DCF}$ within the ranges of $$-82 \leq D_{DCF} \leq -29 \quad (3a)$$

$$0.0023 \times D_{DCF} \leq S_{DCF} \leq 0.033 + 0.0015 \times D_{DCF} \quad (3b)$$

More preferably, the dispersion value $D_{DCF}$ falls within the range of $-82 \leq D_{DCF} \leq -36$. The reason why this range is preferable will be described later.

The leading wavelength of the dispersion compensating optical fiber 12 according to this embodiment falls within the range of 1,565 to 1,700 nm and, more preferably, 1,620 to 1,700 nm. The reason why this range is preferable will be described later.

Figure 3A:
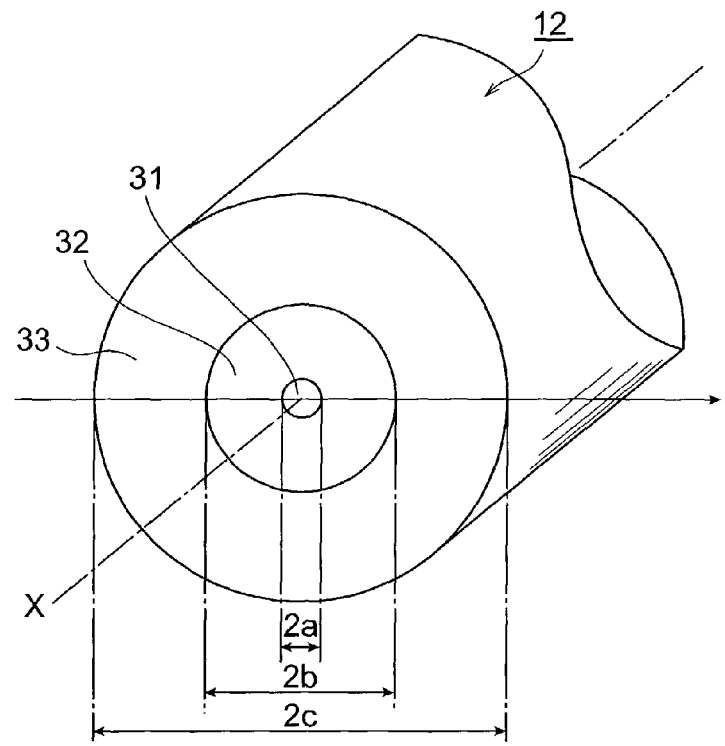
FIG. 3A is a sectional view schematically showing the structure of a dispersion compensating optical fiber according to this embodiment.
Figure 3B:
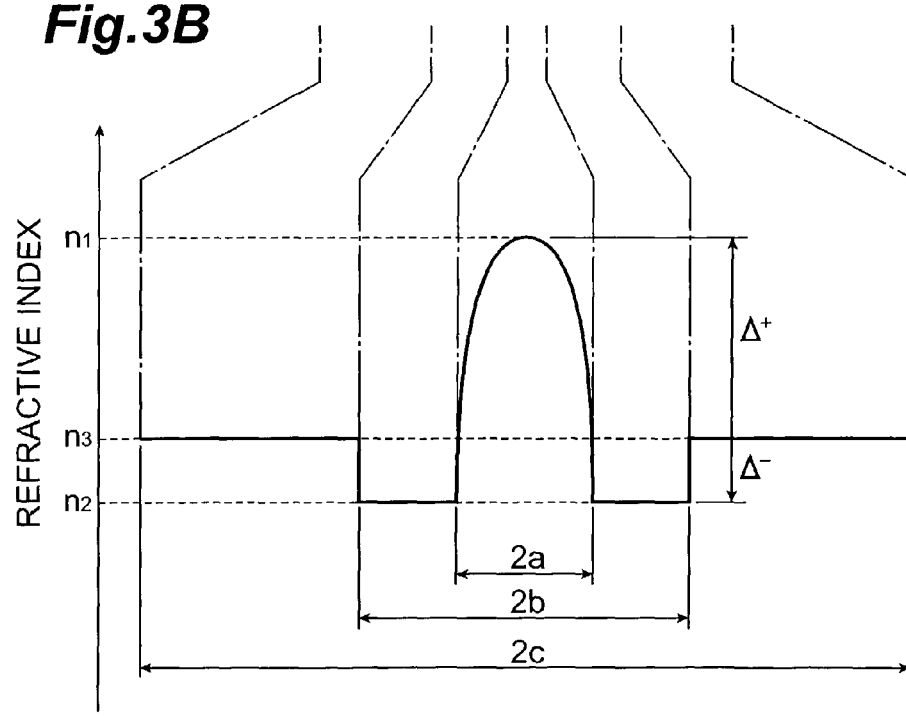
FIG. 3B is a view showing the refractive index profile of the dispersion compensating optical fiber shown in FIG. 3A.

FIG. 3A is a sectional view schematically showing the structure of the dispersion compensating optical fiber 12 according to this embodiment. FIG. 3B is a view showing the refractive index profile of the dispersion compensating optical fiber 12. As shown in FIGS. 3A and 3B, the dispersion compensating optical fiber 12 has a core region 31 including an optical axis center X and having a refractive index $n_1$, a first cladding region 32 surrounding the core region 31 and having a refractive index $n_2$, and a second cladding region 33 surrounding the first cladding region 32 and having a refractive index $n_3$. A relationship $n_1 > n_3 > n_2$ holds between the refractive indices. The dispersion compensating optical fiber 12 with such a structure can be implemented using silica glass as a base by, e.g., doping $GeO_2$ in the core region 31 and F in the first cladding region 32. A relative refractive index difference $\Delta^+$ of the core region 31 to the second cladding region 33 preferably falls within the range of 1.3% to 1.7%, and a relative refractive index difference $\Delta^-$ of the first cladding region 32 to the second cladding region 33 preferably falls within the range of $-0.5\%$ to $-0.2\%$.

The relative refractive index difference $\Delta^+$ of the core region 31 to the second cladding region 33 and the relative refractive index difference $\Delta^-$ of the first cladding region 32 to the second cladding region 33 are defined by $$\Delta^+ = (n_1 - n_3)/n_3$$

$$\Delta^- = (n_2 - n_3)/n_3$$

where $n_1$ is the refractive index of the core region 31, $n_2$ is the refractive index of the first cladding region 32, and $n_3$ is the refractive index of the second cladding region 33. In this specification, the relative refractive index difference is represented in percentage, and the refractive indices of the respective regions in the above definitions are not in order. Hence, when the relative refractive index difference has a negative value, the corresponding region has a refractive index lower than that of the second cladding region 33.

A nonlinear index $\Delta\phi$ of the optical transmission line is defined as follows. More specifically, the nonlinear index $\Delta\phi$ is obtained by integrating the phase modulation factor by self-phase modulation, i.e., a kind of nonlinear phenomenon across the total length of the optical transmission line and given by $$\Delta\phi = K \frac{2\pi}{\lambda} \int_0^L \frac{n_{NL}(z)}{A_{eff}(z)} P(z) dz \qquad (4a)$$

$$P(z) = P_0 e^{-\alpha z} \qquad (4b)$$

where $\lambda$ is the wavelength of light. $A_{eff}(z)$ is the effective area and given by $$A_{eff} = 2\pi \left( \int_0^\infty E^2 r dr \right)^2 / \left( \int_0^\infty E^4 r dr \right) \qquad (5)$$

where E is the electric field accompanying the propagation light, and r is the radial distance from the core center.

In equation (4a), $n_{NL}$ is the nonlinear refractive index. The refractive index <N> of a medium under strong light changes depending on the light intensity. Hence, the effect of lowest degree for the refractive index <N> is $$<N> = <N0> + <N2> \cdot |E|^2$$

where <N0>: refractive index for linear polarization
<N2>: 2nd-order nonlinear refractive index for 3rd-order nonlinear polarization
$|E|^2$: light intensity That is, under strong light, the refractive index <N> of the medium is given by the sum of the normal value <N0> and an increment proportional to the square of the optical field amplitude E. Especially, the proportional constant <N2> (unit: $m^2/W$) of the second term is called a 2nd-order nonlinear refractive index. Additionally since distortion in signal light pulse is mainly affected by the 2nd-order nonlinear refractive index in nonlinear refractive indices, a nonlinear refractive index in this specification mainly means this 2nd-order nonlinear refractive index.

In equation (4b), P(z) is the power of light, and $\alpha$ is the transmission loss in the optical transmission line.

The effective area $A_{eff}(z)$, nonlinear refractive index $n_{NL}(z)$, and power P(z) are functions of a variable z indicating a position on the optical transmission line. $P_0$ is defined to obtain a predetermined power at the exit end of an optical transmission line with a predetermined length. A proportional coefficient k is defined such that the nonlinear index $\Delta\phi$ of the single-mode optical fiber (an optical fiber having a core made of pure silica and a cladding made of F-doped silica) has a value "1".

The nonlinear index $\Delta\phi$ defined so is 2.1 in a dispersion shift optical fiber (NZ-DSF) having a zero dispersion wavelength on the long wavelength side of 1,550 nm. As the value of nonlinear index $\Delta\phi$ increases, the nonlinear optical phenomenon readily occurs. As the value of nonlinear index $\Delta\phi$ becomes small, the nonlinear optical phenomenon hardly occurs. Hence, the value of nonlinear index $\Delta\phi$ in the optical transmission line is preferably as small as possible.

An equivalent effective area (Equivalent $A_{eff}$) is defined by $$\text{Equivalent } A_{eff} = A_{eff}(DSF) \times \Delta\phi(DSF)/\Delta\phi$$

where $\Delta\phi$ is the nonlinear index in the optical transmission line above mentioned, $\Delta\phi(DSF)$ is the nonlinear index in the optical transmission line formed only by NZ-DSF and $A_{eff}(DSF)$ is an effective area of NZ-DSF. The value of Equivalent $A_{eff}$ is preferably as large as possible.

A dispersion slope compensating ratio $\eta$ is defined by $$\eta = 100 \times (S_{DCF}/D_{DCF})/(S_{SMF}/D_{SMF}) \qquad (6)$$

When the dispersion slope compensating ratio $\eta$ is 100%, both the dispersion value $D_{total}$ and dispersion slope $S_{total}$ in the entire optical transmission line 1 can be nullified by appropriately setting the DCF ratio R. When the dispersion slope compensating ratio $\eta$ is lower than 100%, both the dispersion value $D_{total}$ and dispersion slope $S_{total}$ in the entire optical transmission line 1 cannot be simultaneously nullified: when the dispersion value $D_{total}$ is zero, the dispersion slope $S_{total}$ is not zero.

In the optical transmission line 1 shown in FIG. 1, the dispersion value $D_{DCF}$, dispersion slope $S_{DCF}$, effective area $A_{eff}$, and nonlinear refractive index $n_{NL}$ of the dispersion compensating optical fiber 12 were calculated for each value of relative refractive index difference $\Delta^+$ of the core region 31 of the dispersion compensating optical fiber 12 such that the bending loss (bending diameter: 20 mm$\phi$, and wavelength: 1,550 nm) become 2 dB/m. In addition, the loss in dispersion compensating optical fiber 12 was calculated by obtaining the $\Delta^+$ dependence from the past record and interpolating it, and the transmission loss and nonlinear index $\Delta\phi$ of the entire optical transmission line 1 at that time were calculated.

Figure 4:
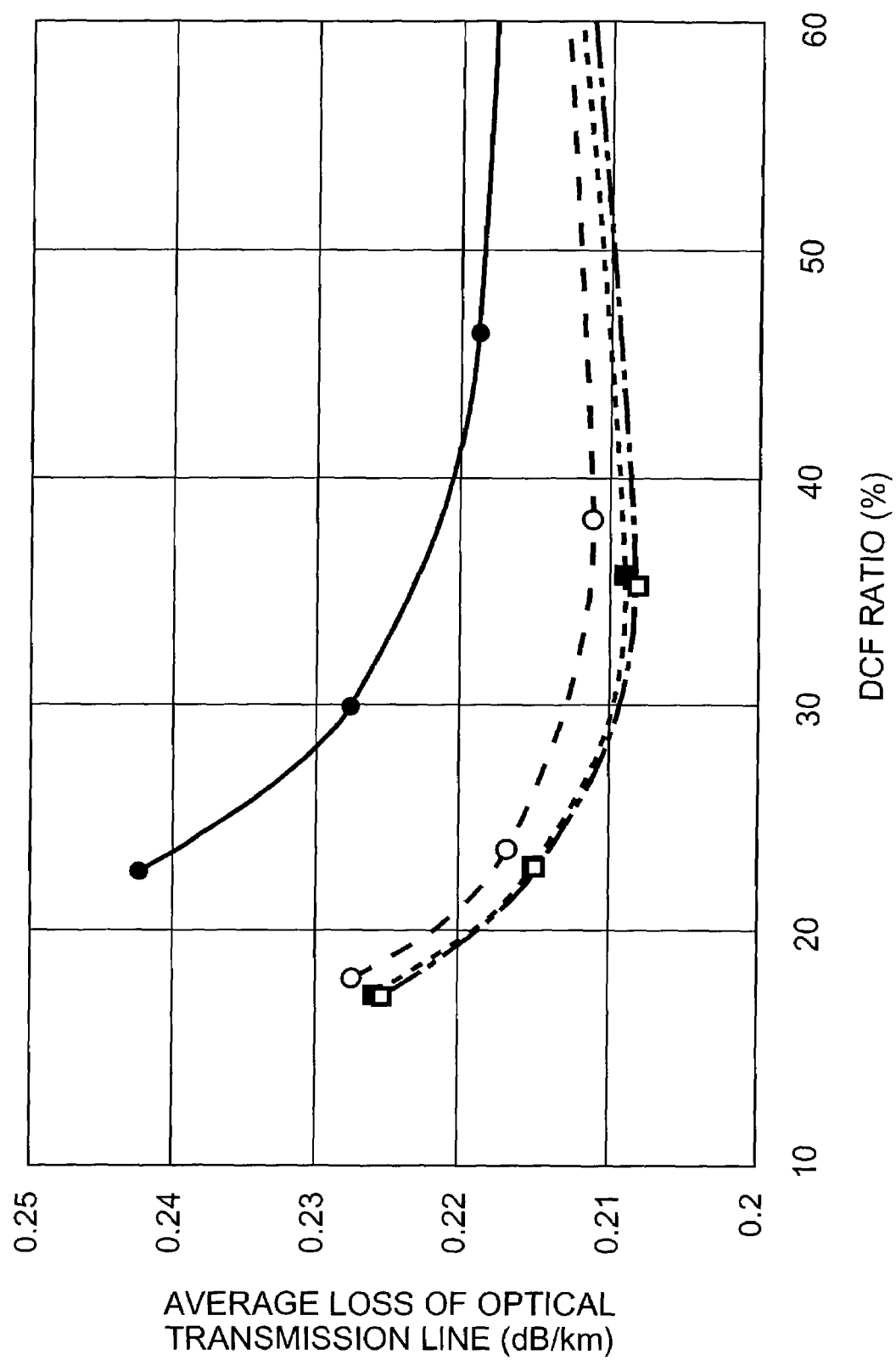
FIG. 4 is a graph showing the relationship between a DCF ratio R and the transmission loss of the entire optical transmission line.
Figure 5:
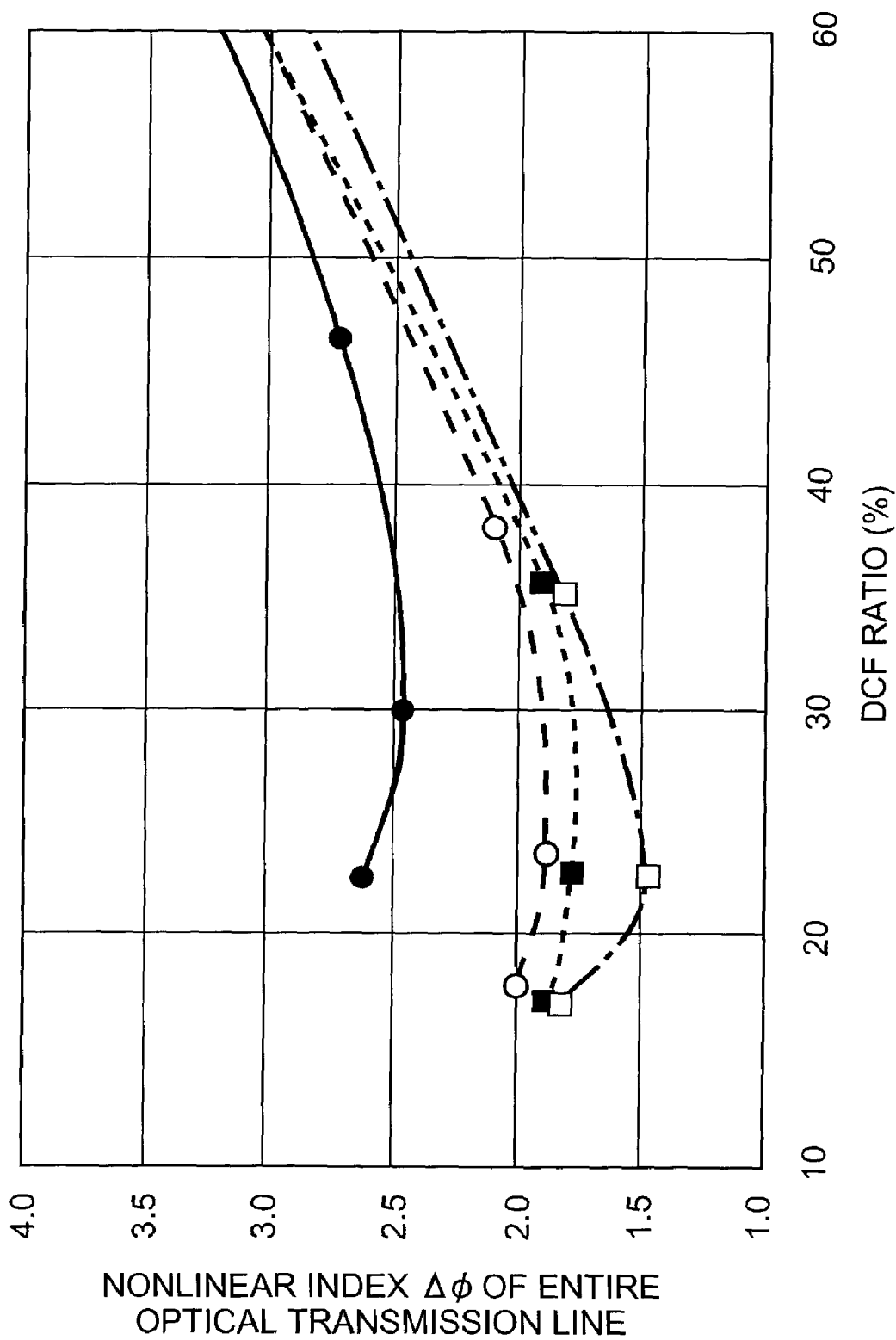
FIG. 5 is a graph showing the relationship between the DCF ratio R and a nonlinear index $\Delta\phi$ of the entire optical transmission line.
Figure 6:
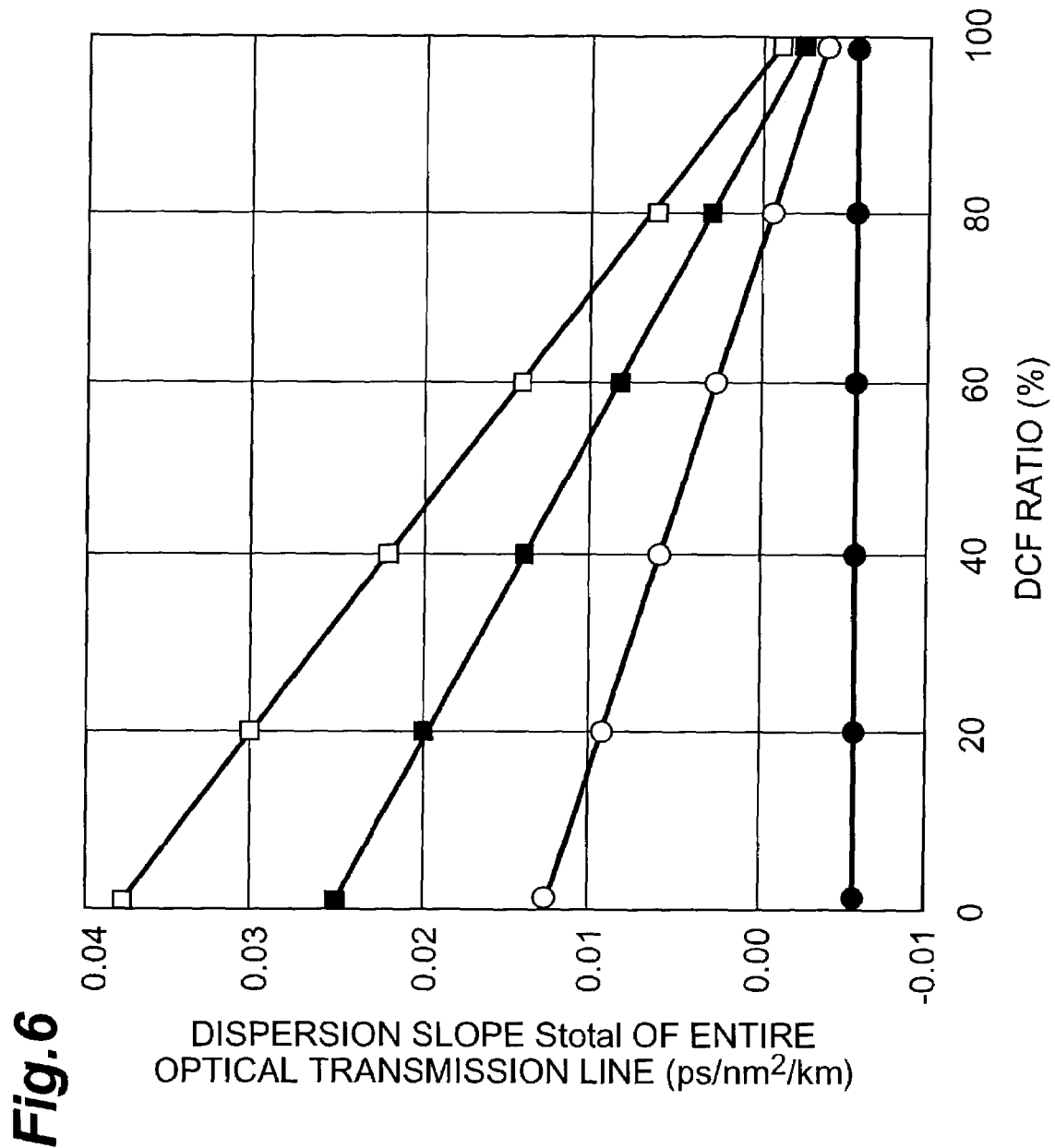
FIG. 6 is a graph showing the relationship between the DCF ratio R and a dispersion slope $S_{total}$ of the entire optical transmission line.

FIG. 4 is a graph showing the relationship between the DCF ratio R and the transmission loss of the entire optical transmission line 1. FIG. 5 is a graph showing the relationship between the DCF ratio R and the nonlinear index $\Delta\phi$ of the entire optical transmission line 1. FIG. 6 is a graph showing the relationship between the DCF ratio R and the dispersion slope $S_{total}$ of the entire optical transmission line 1. In the graphs shown in FIGS. 4 to 6, the dispersion slope compensating ratio $\eta$ is changed to 30% (indicated by hollow square bullets), 50% (indicated by solid square bullet), 70% (indicated by hollow bullets), and 100% (indicated by solid bullets).

Figure 7:
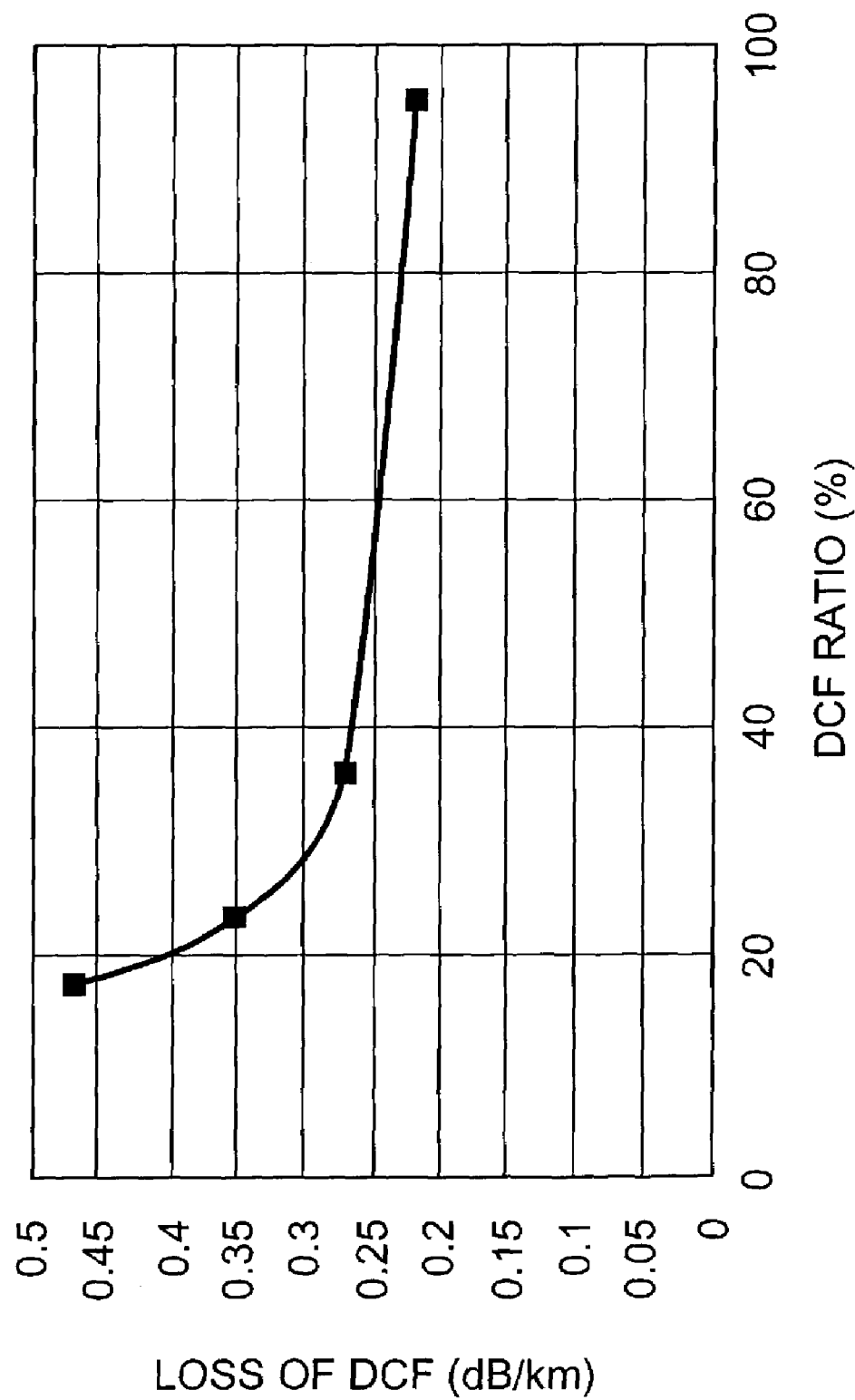
FIG. 7 is a graph showing the relationship between the DCF ratio R and the transmission loss of the dispersion compensating optical fiber.
Figure 8:
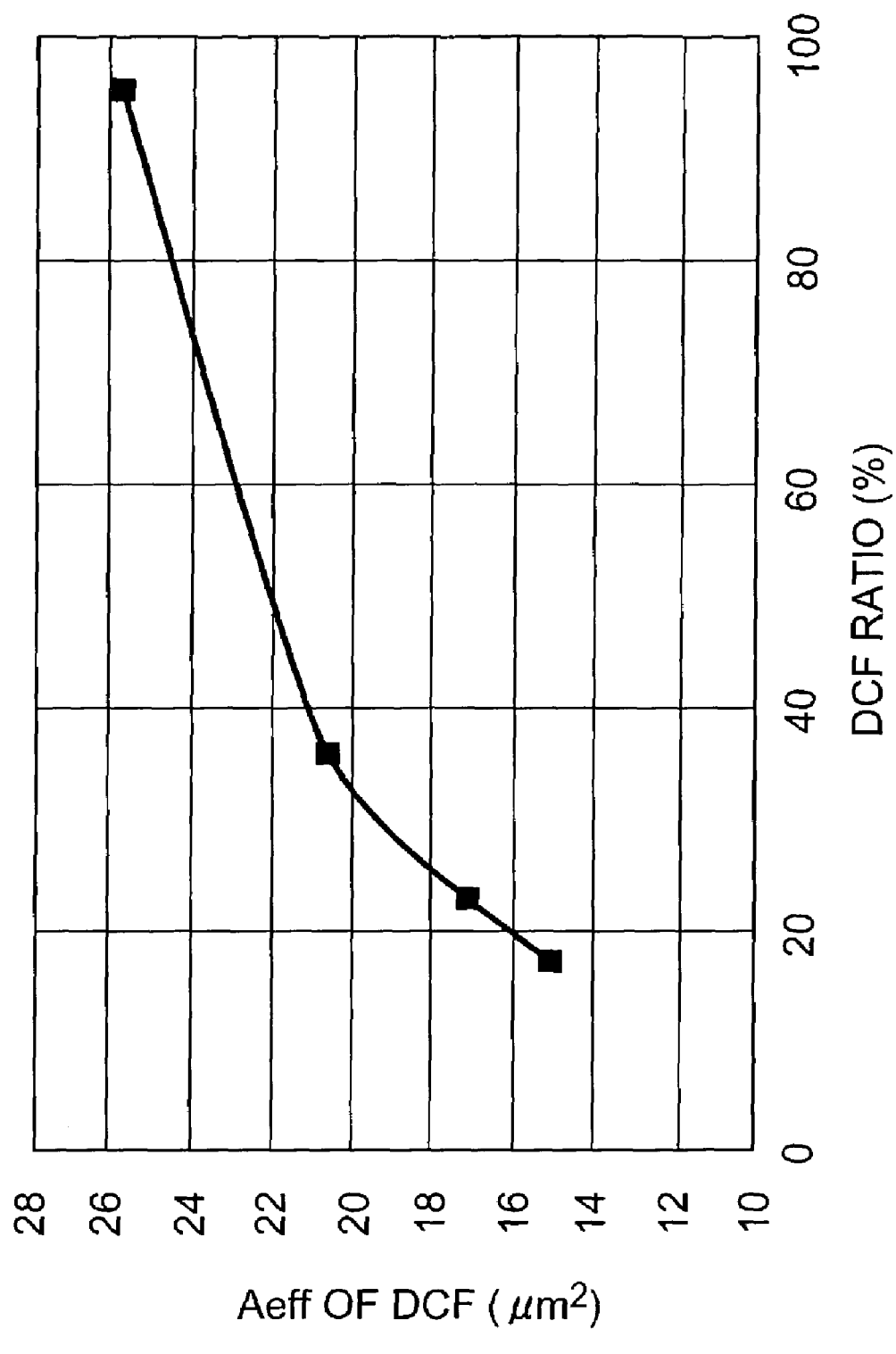
FIG. 8 is a graph showing the relationship between the DCF ratio R and an effective area $A_{eff}$ of the dispersion compensating optical fiber.
Figure 9:
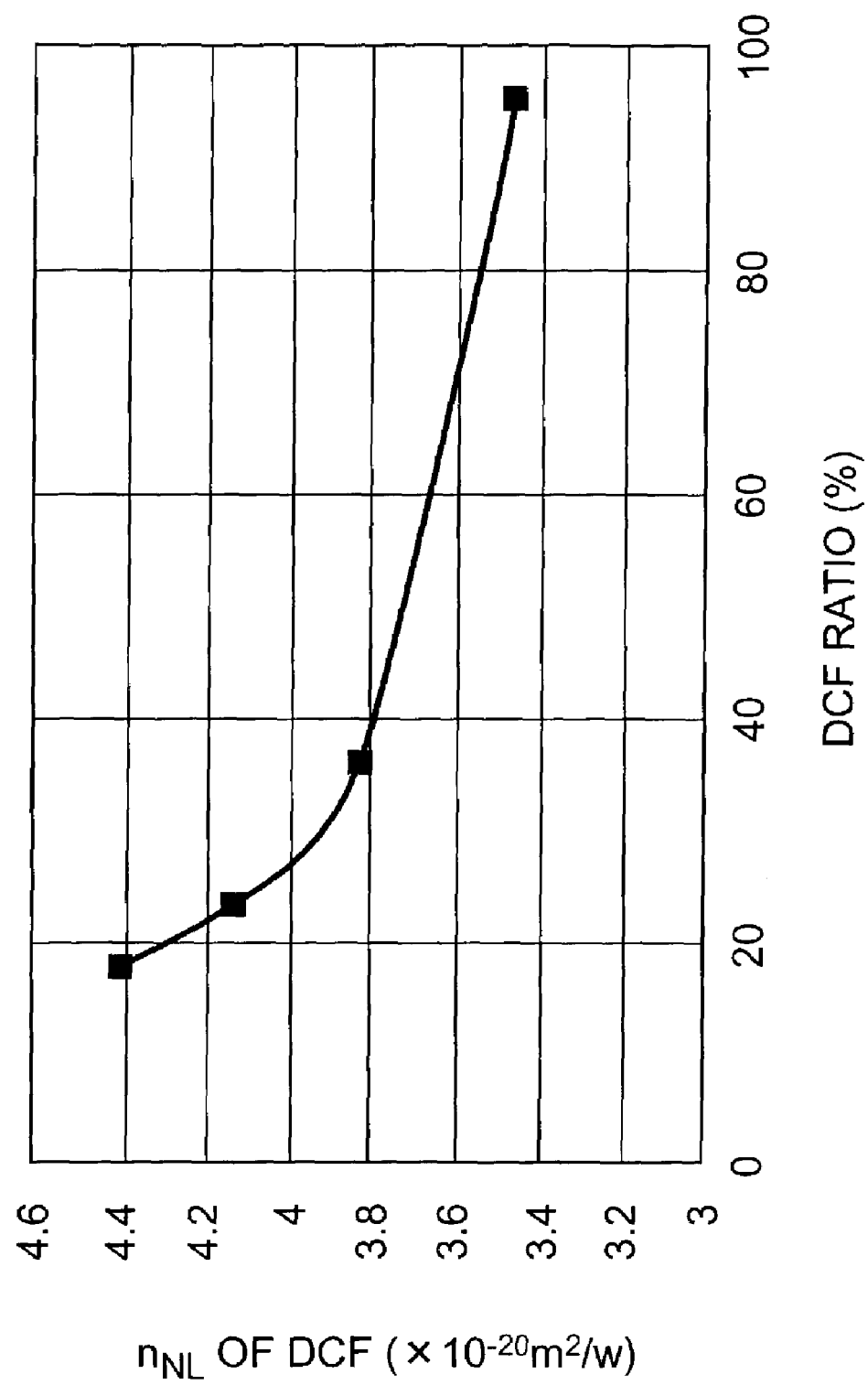
FIG. 9 is a graph showing the relationship between the DCF ratio R and a nonlinear refractive index $n_{NL}$ of the dispersion compensating optical fiber.

FIG. 7 is a graph showing the relationship between the DCF ratio R and the transmission loss of the dispersion compensating optical fiber 12. FIG. 8 is a graph showing the relationship between the DCF ratio R and the effective area $A_{eff}$ of the dispersion compensating optical fiber 12. FIG. 9 is a graph showing the relationship between the DCF ratio R and the nonlinear refractive index $n_{NL}$ of the dispersion compensating optical fiber 12. In the graphs shown in FIGS. 7 to 9, the dispersion slope compensating ratio $\eta$ is 50%, and the bending loss (bending diameter: 20 mm$\phi$, and wavelength: 1,550 nm) is 2 dB/m.

As the single-mode optical fiber 11, an $A_{eff}$-increased pure silica core fiber ($A_{eff}$-increased PSCF) having a core made of pure silica and a cladding made of F-doped silica was used. In this $A_{eff}$-increased PSCF, the transmission loss was 0.175 dB/km, the effective area $A_{eff}$ was 110 $\mu m^2$, the nonlinear refractive index $n_{NL}$ was $2.8 \times 10^{-20}$ $m^2/W$, the dispersion value $D_{SMF}$ was 18.7 ps/nm/km, and the dispersion slope $S_{SMF}$ was 0.057 ps/nm$^2$/km.

As is apparent from the graphs shown in FIGS. 4 and 5, as the dispersion slope compensating ratio $\eta$ becomes low, the transmission loss of the entire optical transmission line 1 decreases, and the nonlinear index $\Delta\phi$ of the entire optical transmission line 1 also decreases. More specifically, to reduce both the transmission loss and nonlinear index of the entire optical transmission line 1, the dispersion slope compensating ratio $\eta$ is preferably as low as possible. The upper limit of the preferable range of the dispersion slope compensating ratio $\eta$ is preferably 80% and, more preferably, 70%. On the other hand, as is apparent from the graph shown in FIG. 6, as the dispersion slope compensating ratio $\eta$ becomes low, the residual dispersion slope $S_{total}$ of the entire optical transmission line 1 when the dispersion value $D_{total}$ of the entire optical transmission line 1 is almost zero increases. To reduce the dispersion slope $S_{total}$ of the entire optical transmission line 1, the dispersion slope compensating ratio $\eta$ is preferably as high as possible. The lower limit of the preferable range of the dispersion slope compensating ratio $\eta$ is preferably 20% and, more preferably, 30%. Hence, the preferable range of the dispersion slope compensating ratio $\eta$ is 20% (more preferably, 30%) to 80% (more preferably, 70%).

As is apparent from the graphs shown in FIGS. 7 to 9, when the dispersion slope compensating ratio $\eta$ is 50%, the higher the DCF ratio is, the smaller the transmission loss of the dispersion compensating optical fiber 12 is. In addition, the higher the DCF ratio R is, the larger the effective area $A_{eff}$ of the dispersion compensating optical fiber 12 is. Furthermore, since the nonlinear refractive index $n_{NL}$ of the dispersion compensating optical fiber 12 is low, the nonlinear optical phenomenon hardly occurs in the dispersion compensating optical fiber 12. However, since the ratio R of the dispersion compensating optical fiber 12 having a loss larger than that of the single-mode optical fiber 11 becomes high, the transmission loss and nonlinear index $\Delta\phi$ of the entire optical transmission line 1 have dependence on the DCF ratio R, as will be described below.

As is apparent from the graphs shown in FIGS. 4 and 5, when the dispersion slope compensating ratio $\eta$ is 80% or less, the transmission loss of the entire optical transmission line 1 is small in the region where the DCF ratio R is 20% or more (more preferably, 25% or more). On the other hand, when the DCF ratio R is 40% or less (more preferably, 35% or less), the nonlinear index $\Delta\phi$ of the entire optical transmission line 1 is low. To reduce both the transmission loss and nonlinear index of the entire optical transmission line 1, the DCF ratio R preferably falls within the range of 20% (more preferably, 25%) to 40% (more preferably, 35%) When the dispersion value $D_{DCF}$ and dispersion slope $S_{DCF}$ of the dispersion compensating optical fiber 12 satisfy equations (3a) and (3b), the preferable ranges of the dispersion slope compensating ratio $\eta$ and DCF ratio R of the optical transmission line 1 are satisfied.

Figure 10:
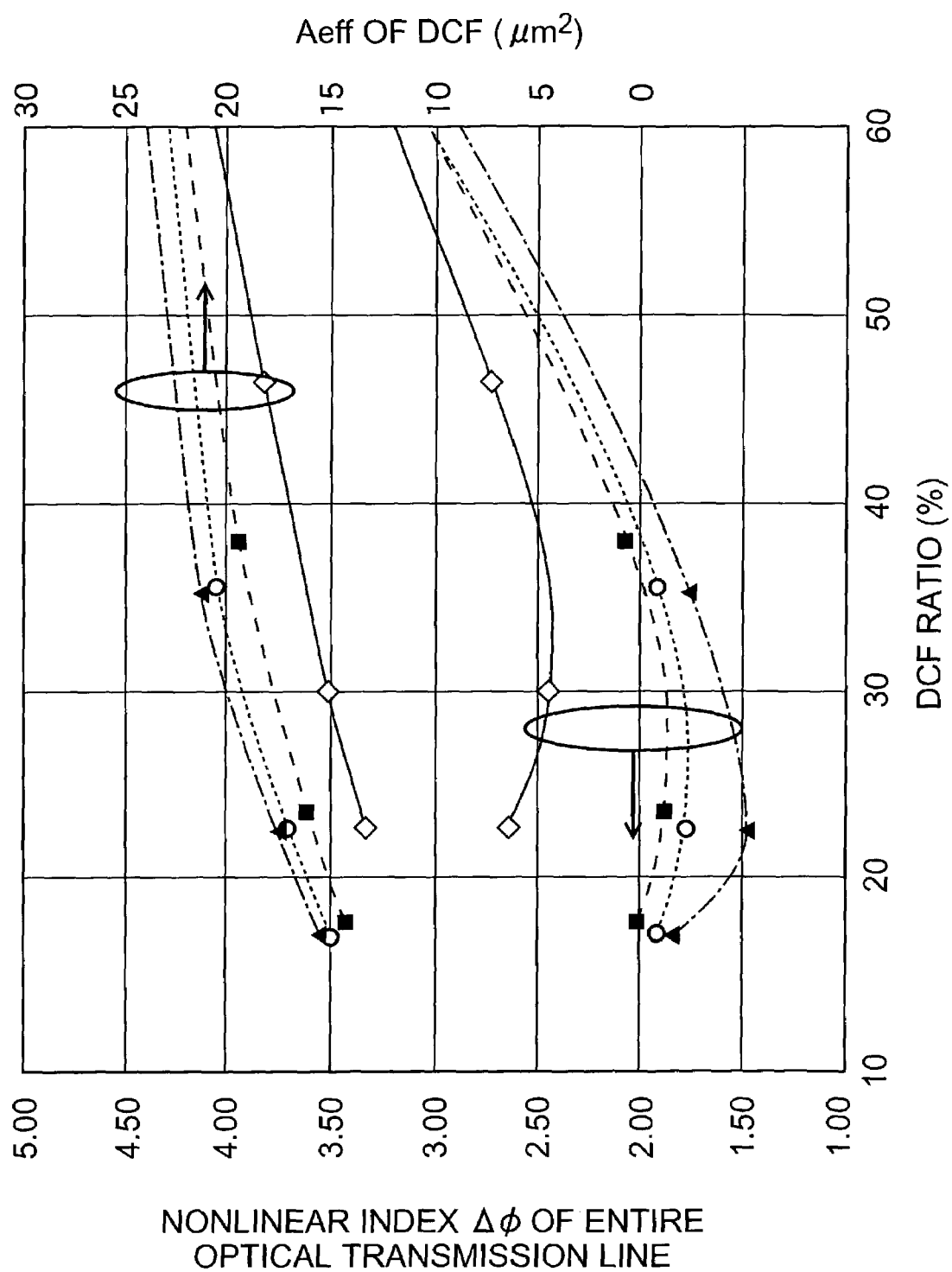
FIG. 10 is a graph showing the relationship between the DCF ratio R and the nonlinear index $\Delta\phi$ of the entire optical transmission line and the relationship between the DCF ratio R and the effective area $A_{eff}$ of the dispersion compensating optical fiber.

FIG. 10 is a graph showing the relationship between the DCF ratio R and the nonlinear index $\Delta\phi$ of the entire optical transmission line 1 and the relationship between the DCF ratio R and the effective area $A_{eff}$ of the dispersion compensating optical fiber 12. Referring to FIG. 10, the dispersion slope compensating ratio $\eta$ is changed to 30% (indicated by hollow square bullets), 50% (indicated by solid square bullet), 70% (indicated by hollow bullets), and 100% (indicated by solid bullets). As is apparent from this graph, the higher the DCF ratio R becomes, the larger the effective area $A_{eff}$ of the dispersion compensating optical fiber 12 becomes. In the above-described preferable ranges of the dispersion slope compensating ratio $\eta$ (20% to 80%) and DCF ratio R (20% to 40%), the effective area $A_{eff}$ of the dispersion compensating optical fiber 12 is 14 $\mu m^2$ or more.

The reason why the preferable ranges of the dispersion value $D_{DCF}$ and dispersion slope $S_{DCF}$ of the dispersion compensating optical fiber 12 according to this embodiment at the wavelength of 1,550 nm are represented by equations (3a) and (3b) will be described next.

To obtain the preferable ranges of the dispersion value $D_{DCF}$ and dispersion slope $S_{DCF}$, an optical fiber having the refractive index profile shown in FIGS. 2A and 2B was used as the dispersion compensating optical fiber 12 of the optical transmission line 1. The relative refractive index difference $\Delta^-$ between the first cladding region 32 and the second cladding region 33 was fixed to −0.36%. Under this condition, the relative refractive index difference $\Delta^+$ between the core region 31 and the second cladding region 33, a diameter 2$a$ of the core region 31, and a ratio $R_a$ (=2$a$/2$b$) of the diameter of the core region 31 to an outer diameter 2$b$ of the first cladding region 32 were changed as parameters whereby the optimum design of the dispersion compensating optical fiber 12 was examined.

First, the dispersion value, dispersion slope, and effective area $A_{eff}$ when the leading wavelength of the dispersion compensating optical fiber was fixed were calculated while changing the relative refractive index difference $\Delta^+$, and the nonlinear index at each relative refractive index difference $\Delta^+$ was calculated on the basis of equations (4a) and (4b). As the single-mode optical fiber 11, an $A_{eff}$-increased pure silica core fiber ($A_{eff}$-increased PSCF) having a core made of pure silica and a cladding made of F-doped silica was used. In this $A_{eff}$-increased PSCF, the transmission loss was 0.175 dB/km, the effective area $A_{eff}$ was 110 $\mu m^2$, the nonlinear refractive index $n_{NL}$ was $2.8 \times 10^{-20}$ m$^2$/W, the dispersion value $D_{SMF}$ was 18.7 ps/nm/km, and the dispersion slope $S_{SMF}$ was 0.057 ps/nm$^2$/km.

As for the arrangement of the optical transmission line 1, one span was set to 50 km, and the average dispersion in each span was −2 ps/nm/km, thereby determining the lengths of the single-mode optical fiber 11 and dispersion compensating optical fiber 12. The average transmission loss and average dispersion slope were average values in the entire optical transmission line 1 between stations (repeaters 21 and 22 in FIG. 1). Under these conditions, the nonlinear index was calculated on the basis of equation (4a).

Figure 11:
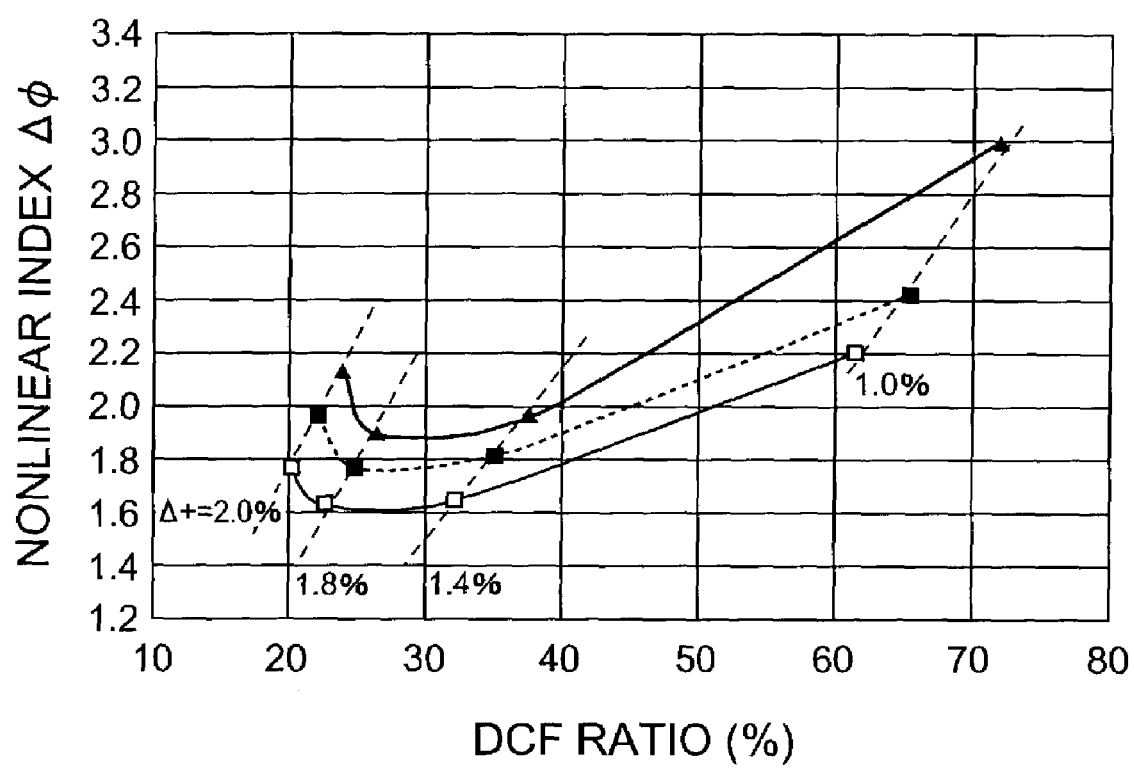
FIG. 11 is a graph showing the relationship between the DCF ratio R and the nonlinear index $\Delta\phi$ of the entire optical transmission line when the leading wavelength is 1,650 nm.

FIG. 11 is a graph showing the relationship between the DCF ratio R and the nonlinear index $\Delta\phi$ of the entire optical transmission line when the leading wavelength is 1,650 nm. Referring to FIG. 11, the dispersion slope compensating ratio $\eta$ is changed to 30% (indicated by hollow square bullets), 50% (indicated by solid square bullet), and 60% (indicated by solid triangles). As shown in FIG. 11, when the DCF ratio R is about 25%, the nonlinear index is minimum, and the nonlinearity in the optical transmission line 1 is minimum. The preferable range of the DCF ratio R capable of suppressing the nonlinearity is 0.2 to 0.4. When the average dispersion in each span is −2 to −1 ps/nm/km, the preferable range of the dispersion value $D_{DCF}$ of the dispersion compensating optical fiber, which is calculated from equation (2a), is $$-82 \leq D_{DCF} \leq -29$$

This dispersion compensating optical fiber 12 is preferable for long-distance large-capacity transmission because the nonlinear index of the entire optical transmission line 1 can be sufficiently suppressed when the optical transmission line is formed by connecting the dispersion compensating optical fiber 12 to the single-mode optical fiber 11. The reason why the range of −2 to −1 ps/nm/km is selected as the average dispersion between the stations 21 and 22 is that the modulation instability can be suppressed by the negative value and degradation in signal waveform due to interphase modulation as a nonlinear effect can be suppressed.

When the DCF ratio R is 0.2 o 0.35, the preferable range of the dispersion value $D_{DCF}$ of the dispersion compensating optical fiber 12 is $$-82 \leq D_{DCF} \leq -36$$

This reduces the nonlinearity of the dispersion compensating optical fiber 12 and further decreases the nonlinear index $\Delta\phi$ of the optical transmission line 1 itself. Since the nonlinearity of the optical transmission line 1 itself is larger than that of the single-mode optical fiber 11, the nonlinearity of the entire optical transmission line 1 becomes large when the dispersion compensating optical fiber 12 is long. Hence, when the DCF ratio is reduced, the nonlinearity of the entire optical transmission line 1 can be made small.

When equation (2b) is used, the preferable range of the dispersion slope $S_{DCF}$ of the dispersion compensating optical fiber 12 can be obtained on the basis of the dispersion slope $S_{total}$ of the entire optical transmission line 1, the dispersion slope $S_{SMF}$ of the single-mode optical fiber, and the DCF ratio R. More specifically, since the dispersion slope $S_{total}$ of the entire optical transmission line 1 is preferably 0.03 ps/nm$^2$/km, $$S_{DCF} \leq \{0.03 - (1-R)S_{SMF}\}/R \tag{7}$$

Substitutions of R of equation (2a), $D_{SMF}$=18 ps/nm/km, and $S_{SMF}$=0.06 ps/nm$^2$/km into equation (7) yield $$S_{DCF} \leq \{0.06 \cdot D_{total} - 0.03 \cdot (D_{DCF}+18)\}/\{D_{total}-18\} \tag{8}$$

Assuming that $-2 \leq D_{total} \leq -1$, the upper limit value of $S_{DCF}$ is obtained when $D_{total}=-2$ ps/nm/km. This defines the upper limit of the dispersion slope $S_{DCF}$ of the dispersion compensating optical fiber 12 in equation (3b).

A dispersion shift optical fiber (NZ-DSF, transmission loss=0.21 dB/km, effective area $A_{eff}$=55 $\mu m^2$, and nonlinear refractive index $n_{NL}$=3.2×10$^{-20}$ m$^2$/W) having the zero dispersion wavelength on the long wavelength side of 1,550 nm and used for submarine cable has a nonlinear index $\Delta\phi$ of about 2.1. For a nonlinear index $\Delta\phi$ smaller than 2.1, the dispersion slope compensating ratio $\eta$ defined by equation (6) must be 70% or less (FIG. 5). When $D_{SMF}$=18 ps/nm/km and $S_{SMF}$=0.06 ps/nm$^2$/km are substituted into the inequality under $\eta \leq 70\%$, the lower limit of the dispersion slope $S_{DCF}$ of the dispersion compensating optical fiber 12 in equation (3b) is defined.

The preferable range of a loss $\alpha_{DCF}$ of the dispersion compensating optical fiber 12 is obtained in the following way. Letting $\alpha_{SMF}$ be the loss of the single-mode optical fiber, an average loss $\alpha_{total}$ of the entire optical transmission line 1 is given by $$\alpha_{total} = (1-R)\alpha_{SMF} + R \cdot \alpha_{DCF} \tag{9}$$

Since the loss $\alpha_{SMF}$ is preferably about 0.175 dB/km, and the average loss $\alpha_{total}$ is preferably 0.24 dB/km or less, the loss $\alpha_{DCF}$ of the dispersion compensating optical fiber 12 is preferably 0.5 dB/km or less. In addition, since the average loss $\alpha_{total}$ is more preferably 0.22 dB/km or less, the loss $\alpha_{DCF}$ of the dispersion compensating optical fiber 12 is more preferably 0.4 dB/km or less.

Figure 12:
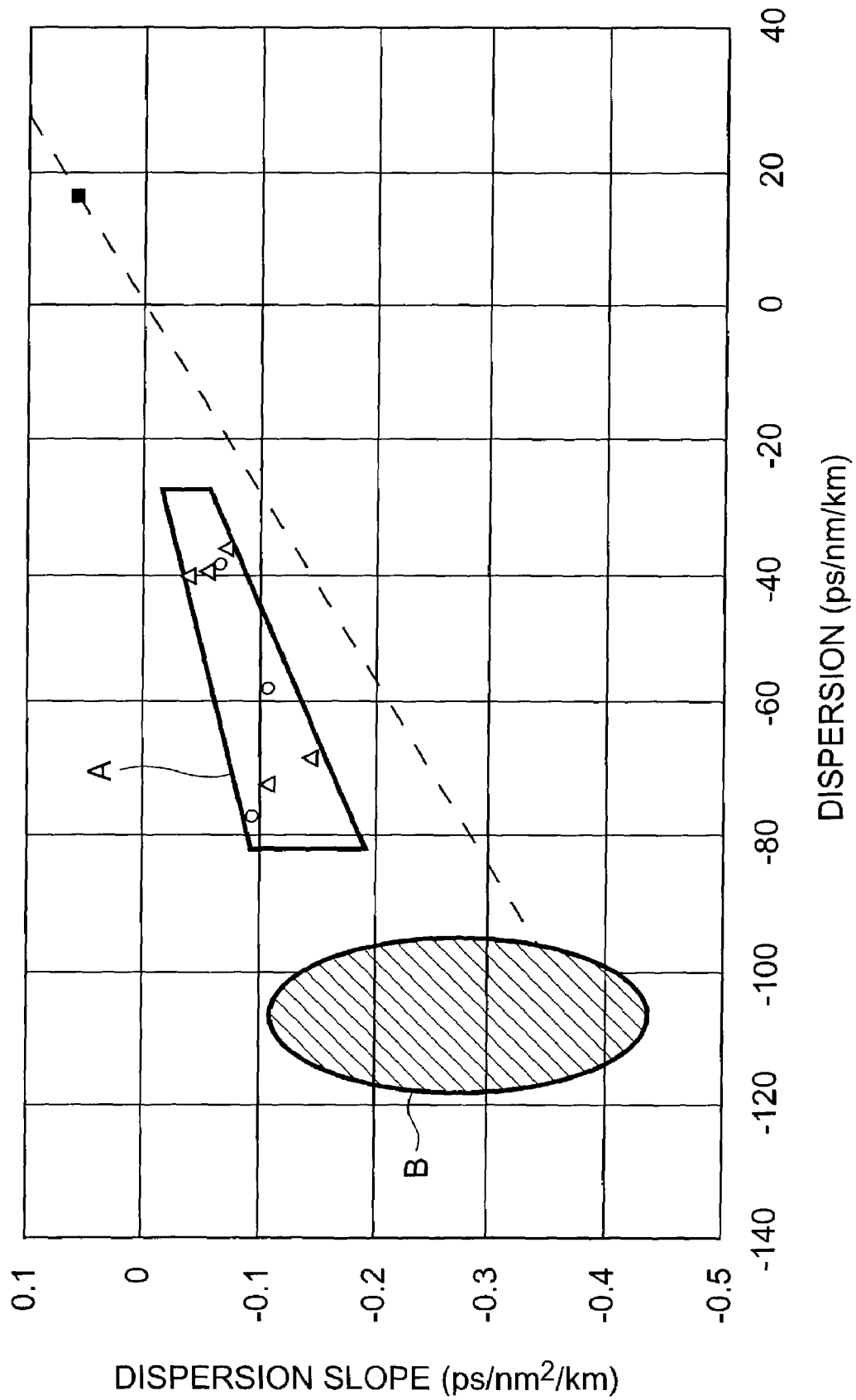
FIG. 12 is a graph showing the preferable range of a dispersion value $D_{DCF}$ and dispersion slope $S_{DCF}$ of the dispersion compensating optical fiber according to this embodiment.

FIG. 12 is a graph showing the preferable ranges (region A indicated by a rectangle) of the dispersion value $D_{DCF}$ and dispersion slope $S_{DCF}$ of the dispersion compensating optical fiber 12 according to this embodiment at the wavelength of 1,550 nm. In this graph, the range (region B indicated by an ellipse) of the dispersion value and dispersion slope of a conventional dispersion compensating optical fiber at the wavelength of 1,550 nm, and the dispersion value and dispersion slope (indicated by a solid square bullet) of the single-mode optical fiber (SMF) are also shown. This graph also shows the dispersion values and dispersion slopes (indicated by hollow bullets and hollow triangles) of eight examples (to be described later) of the dispersion compensating optical fiber 12 according to this embodiment.

Figure 13:
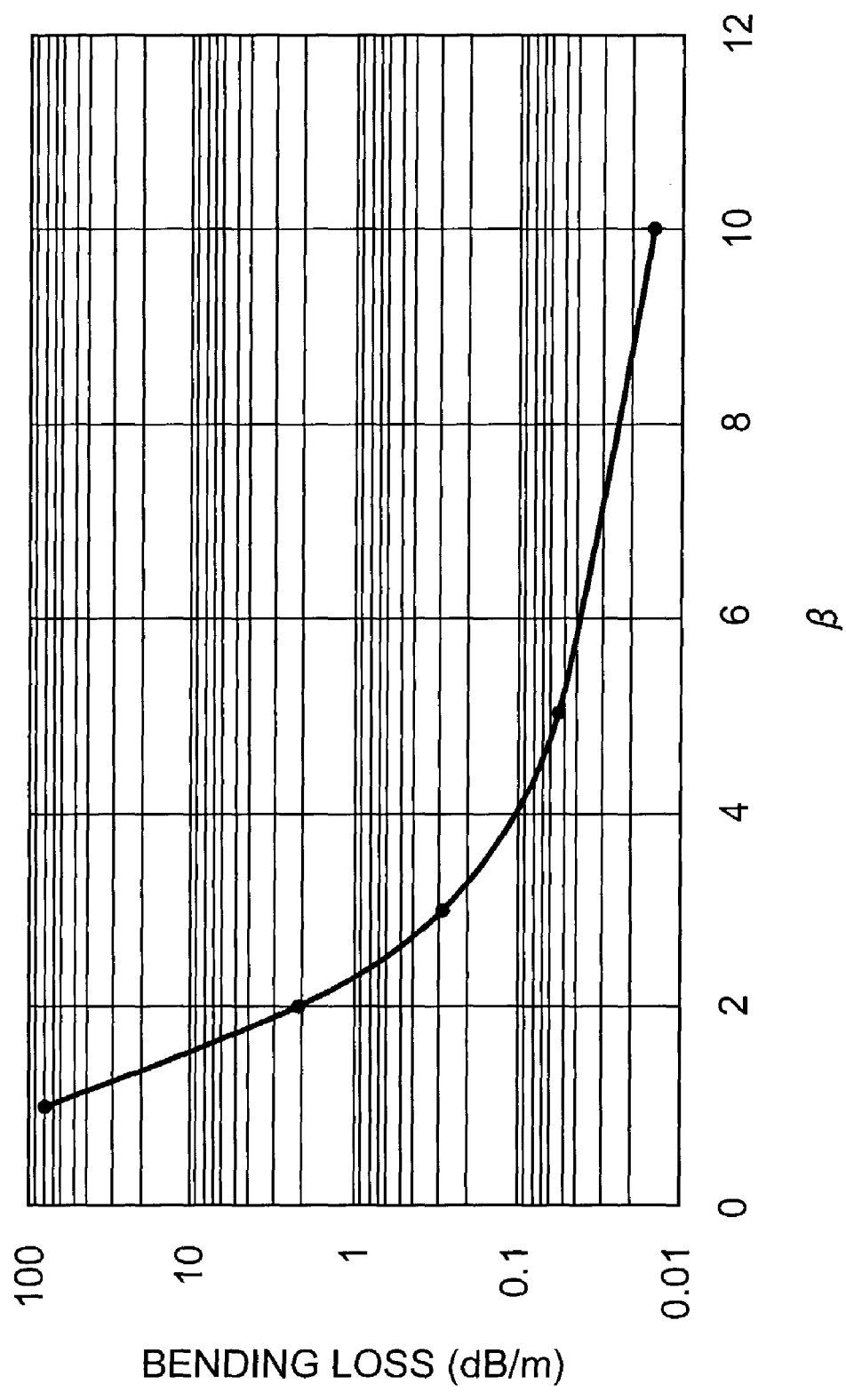
FIG. 13 is a graph showing the relationship between the value $\beta$ and the bending loss of the dispersion compensating optical fiber.

The bending loss (bending diameter: 20 mm$\phi$, and wavelength: 1,550 nm) and transmission loss of the dispersion compensating optical fiber 12 will be described next. Assume that the core region 31 ($0 \leq r \leq a$) of the dispersion compensating optical fiber 12 shown in FIGS. 3A and 3B has an index distribution $n(r)$ of $\beta$th power, which is given by $$n(r) = n_1 \left\{ 1 - 2\Delta \left(\frac{r}{a}\right)^\beta \right\}^{1/2} \tag{10a}$$

$$\Delta = \frac{n_1^2 - n_2^2}{2n_1^2} \tag{10b}$$

where r is the radial distance from the center of the core region 31, $n_1$ is the refractive index at the center (r=0) of the core region 31, and $n_2$ is the refractive index of the first cladding region 32. Assume that the relative refractive index difference $\Delta^+$ of the core region 31 is +1.6%, and the relative refractive index difference $\Delta^-$ of the first cladding region 32 is −0.36%. The dispersion value $D_{DCF}$ of the dispersion compensating optical fiber 12 is −50 ps/nm/km, and the dispersion slope compensating ratio η is 50%. FIG. 13 is a graph showing the relationship between the value β and the bending loss of the dispersion compensating optical fiber 12. As is apparent from this graph, the larger the value β is, the smaller the bending loss of the dispersion compensating optical fiber 12 is. When the value β is 2.0 or more, the bending loss of the dispersion compensating optical fiber 12 is suitably 2 dB/m or less. At this time, the transmission loss of the dispersion compensating optical fiber 12 is suitably 0.4 dB/km or less.

The microbend loss of the dispersion compensating optical fiber 12 will be described next. A microbend loss is a loss generated when a side pressure is applied to the optical fiber to slightly bend the optical fiber axis. The microbend loss is measured as a loss that increases when the optical fiber is wound on a 280-mmφ bobbin with No. 1,000 sandpaper at a tensile force of 100 g. The smaller the diameter of the core 31 is, the smaller the microbend loss is. The larger the outer diameter (optical fiber diameter) of the second cladding region 33 is, the smaller the microbend loss is. The larger the diameter of resin coating around the second cladding region 33 is, the smaller the microbend loss is. On the other hand, when the outer diameter (optical fiber diameter) or coating diameter of the second cladding region 33 is large, a cable formed from the optical fiber undesirably becomes bulky. In addition, when the outer diameter (optical fiber diameter) of the second cladding region 33 is large, the rupture probability of the optical fiber becomes high. To sufficiently reduce the microbend loss, the coating diameter preferably falls within the range of 235 to 415 μm. To sufficiently reduce the microbend loss and obtain a rupture probability of $10^{-5}$ or less, which poses no practical problem, the outer diameter (optical fiber diameter) of the second cladding region 33 preferably falls within the range of 115 to 200 μm.

The reason why the leading wavelength preferably falls within the range of 1,565 to 1,700 nm and, more preferably, 1,620 to 1,700 nm will be described next.

Losses unique to an optical fiber include a loss due to Rayleigh scattering, a loss due to absorption, and a loss due to structure mismatching. Letting λ (unit: μm) be the wavelength of an optical signal, a Rayleigh scattering loss is represented by $A/\lambda^4$ where A is the Rayleigh scattering coefficient. A loss due to structure mismatching is represented by a constant B. An absorption loss in the infrared range is represented by $C \cdot \exp(-D/\lambda)$ where C is a constant (=6.65×10$^{12}$) and D is a constant (=52.67). That is, a theoretical loss value $\alpha_0(\lambda)$ of the optical fiber in the infrared range is given by $$\alpha_0(\lambda) = A/\lambda^4 + B + C \cdot \exp(-D/\lambda) \tag{11}$$

As the manufacturing technique improves, the loss of an optical fiber is reaching the theoretical loss value $\alpha_0$.

However, the loss (actual loss value $\alpha_1(\lambda)$) in actual use of the optical fiber may be larger than the theoretical loss value $\alpha_0(\lambda)$. This phenomenon is caused by bending and readily occurs as the wavelength λ becomes long, and especially, in the dispersion compensating optical fiber. If the actual loss value $\alpha_1$ of the optical fiber becomes large in the use wavelength band, an optical transmission system using this optical fiber as an optical transmission line requires a number of optical amplifiers for amplifying an optical signal, resulting in high cost. Alternatively, pulses readily deform due to the nonlinear phenomenon which occurs when high-power light is incident. Hence, to prevent the transmission loss from increasing in the use wavelength band, the leading wavelength of the dispersion compensating optical fiber 12 must be defined. The preferable range of the leading wavelength of the dispersion compensating optical fiber 12 is obtained in the following way.

Figure 14:
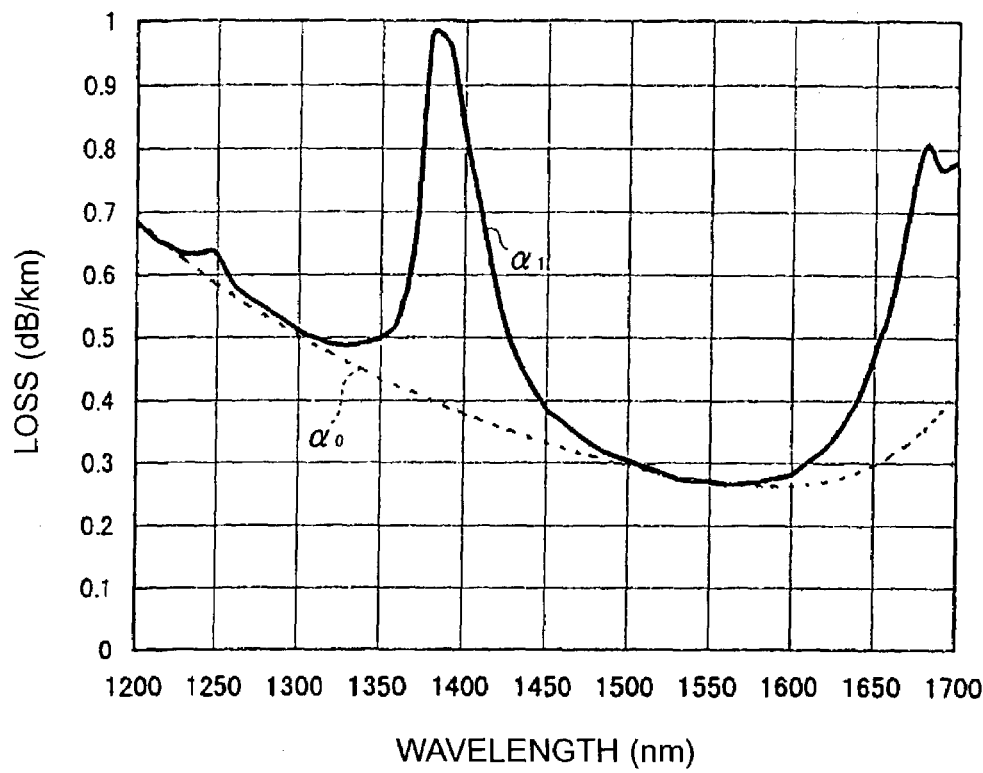
FIG. 14 is a graph showing an actual loss value $\alpha_1(\lambda)$ and theoretical loss value $\alpha_0(\lambda)$ of the dispersion compensating optical fiber.
Figure 15:
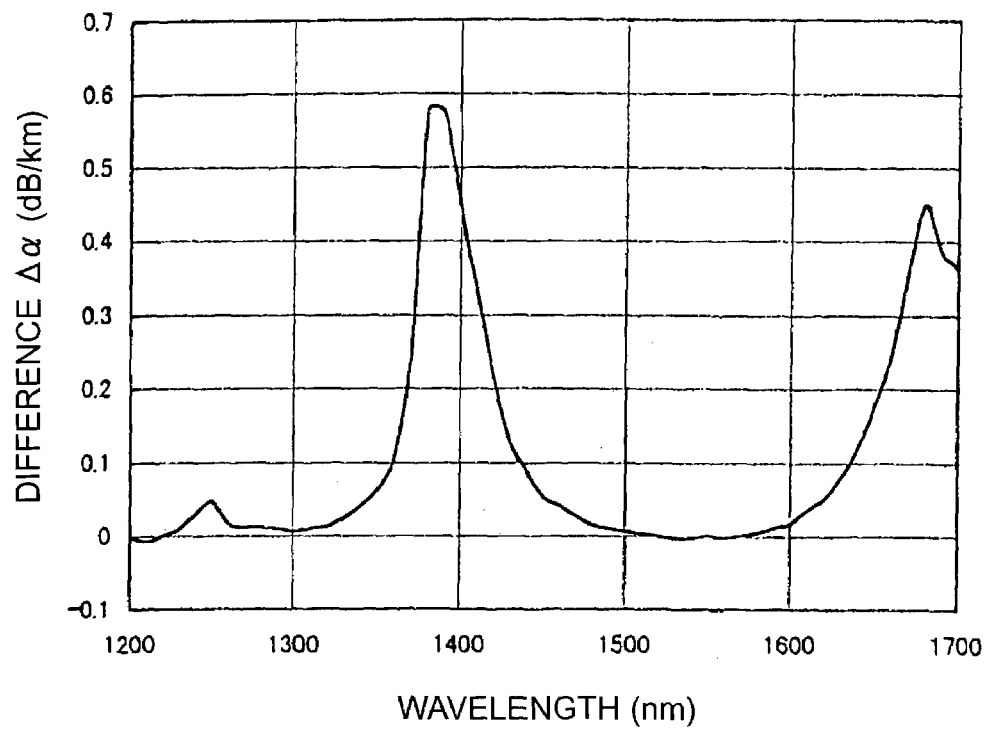
FIG. 15 is a graph showing a difference $\Delta\alpha(\lambda)$ between the actual loss value $\alpha_1(\lambda)$ and the theoretical loss value $\alpha_0(\lambda)$ of the dispersion compensating optical fiber.
Figure 16:
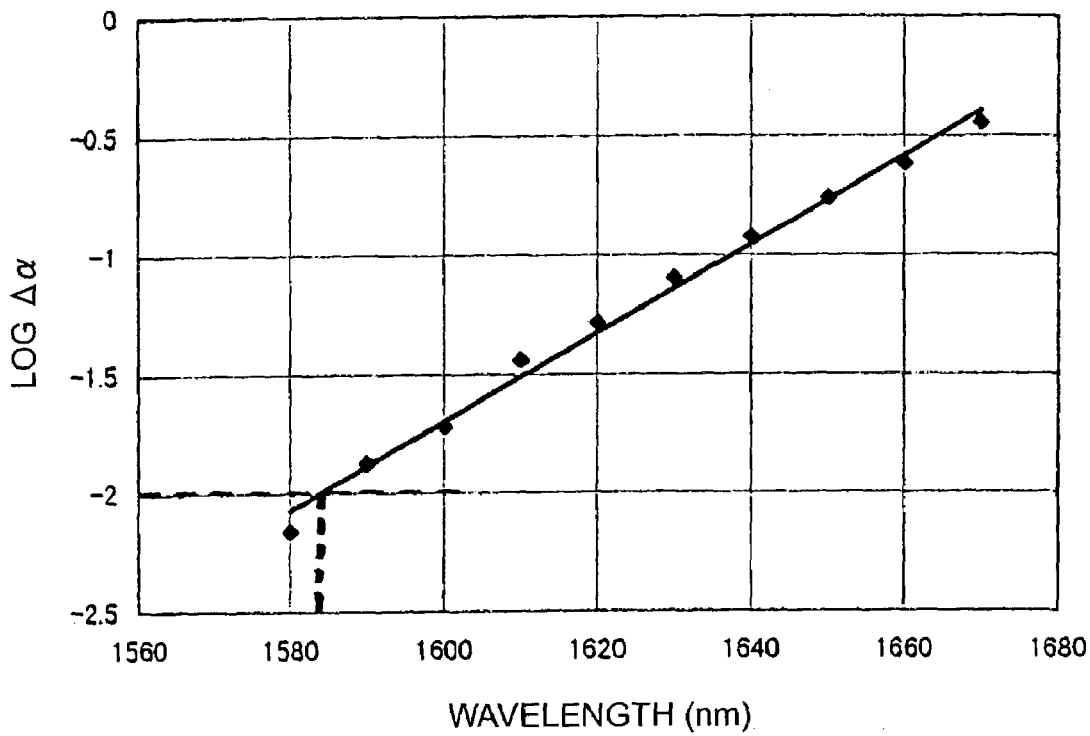
FIG. 16 is a graph showing a logarithm log ($\Delta\alpha(\lambda)$)

The "leading wavelength" is defined as follows. FIGS. 14 to 16 are explanatory views of the leading wavelength. Referring to FIG. 14, the solid line indicates the actual loss value $\alpha_1(\lambda)$ of the dispersion compensating optical fiber 12, and the broken line indicates the theoretical loss value $\alpha_0(\lambda)$. As shown in FIG. 14, the theoretical loss value $\alpha_0(\lambda)$ of the dispersion compensating optical fiber 12 is minimum near a wavelength band of 1,500 to 1,650 nm. On the other hand, the actual loss value $\alpha_1(\lambda)$ of the dispersion compensating optical fiber 12 almost matches the theoretical loss value $\alpha_0(\lambda)$ near a wavelength of 1,550 nm. Hence, a wavelength band of 1,520 to 1,565 nm is used as a signal wavelength band for an optical transmission system. A wavelength band of 1,565 to 1,620 nm may also be used. Referring to FIG. 14, the actual loss value $\alpha_1(\lambda)$ is larger than the theoretical loss value $\alpha_0(\lambda)$ near a wavelength of 1,380 nm due to the hydroxyl group and also larger than the theoretical loss value $\alpha_0(\lambda)$ near a wavelength of 1,580 nm.

FIG. 15 is a graph showing a difference $\Delta\alpha(\lambda)$ between the actual loss value $\alpha_1(\lambda)$ and the theoretical loss value $\alpha_0(\lambda)$ of the dispersion compensating optical fiber 12 shown in FIG. 14. The difference $\Delta\alpha(\lambda)$ is given by $$\Delta\alpha(\lambda) = \alpha_1(\lambda) - \alpha_0(\lambda) \tag{12}$$

FIG. 16 is a graph showing a logarithm log ($\Delta\alpha(\lambda)$) of this difference. As shown in the graph of FIG. 16, the logarithm log ($\Delta\alpha(\lambda)$) and the wavelength λ have an almost linear relationship when the wavelength is 1,580 nm or more. The minimum wavelength corresponding to a logarithm log ($\Delta\alpha(\lambda)$) of −2 or more (i.e., the value $\Delta\alpha(\lambda)$ is 10 mdB/km or more) in the use wavelength band and on the long wavelength side of the use wavelength band is defined as a "leading wavelength". For the dispersion compensating optical fiber 12 having the actual loss value $\alpha_1(\lambda)$ shown in FIGS. 14 to 16, the leading wavelength is 1,582 nm. As the characteristics of this dispersion compensating optical fiber 12, the transmission loss is 0.267 dB/km, the dispersion value is −55.12 ps/nm/km, the dispersion slope is −0.049 ps/nm$^2$/km, the mode field diameter (MFD) is 5.4 μm, the effective area $A_{eff}$ is 21.9 μm$^2$, and the bending loss (20φ) is 4.1 dB/m.

Figure 17:
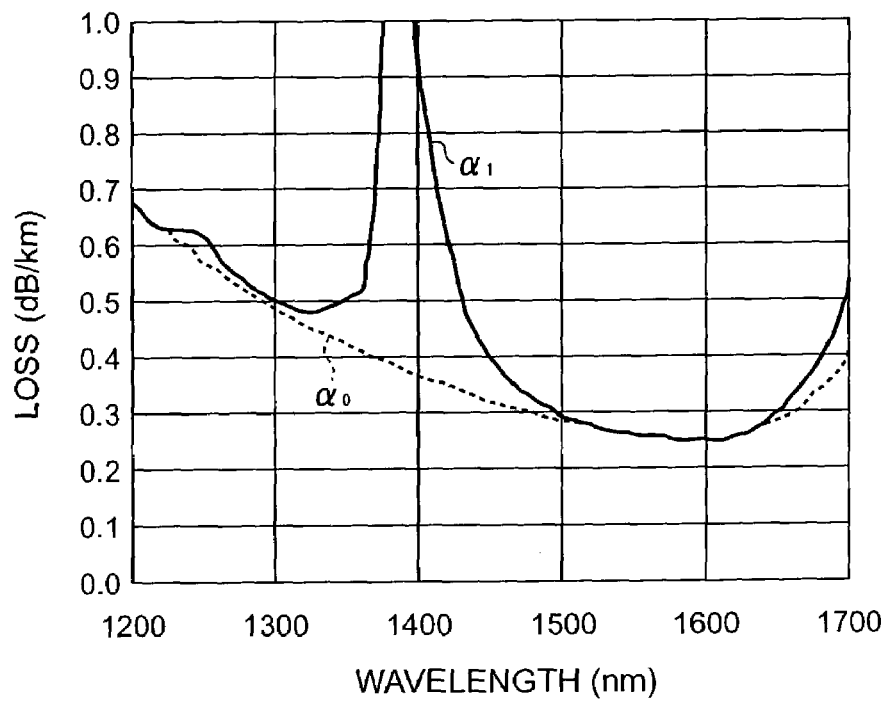
FIG. 17 is a graph showing the actual loss value $\alpha_1(\lambda)$ and theoretical loss value $\alpha_0(\lambda)$ of another dispersion compensating optical fiber.
Figure 18:
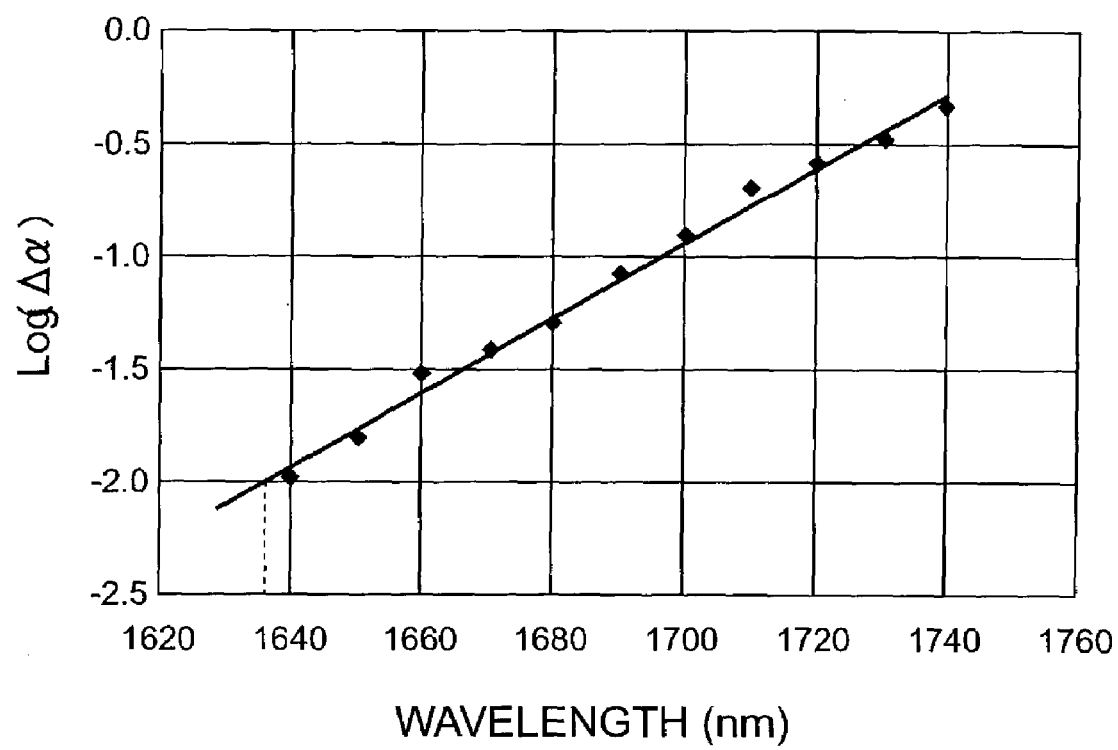
FIG. 18 is a graph showing the logarithm log ($\Delta\alpha(\lambda)$) of the difference $\Delta\alpha(\lambda)$ between the actual loss value $\alpha_1(\lambda)$ and the theoretical loss value $\alpha_0(\lambda)$ of another dispersion compensating optical fiber.

FIGS. 17 and 18 are explanatory views of the leading wavelength of another dispersion compensating optical fiber 12. Referring to FIG. 17, the solid line indicates the actual loss value $\alpha_1(\lambda)$ of the dispersion compensating optical fiber 12, and the broken line indicates the theoretical loss value $\alpha_0(\lambda)$. As shown in FIG. 17, the theoretical loss value $\alpha_0(\lambda)$ of the dispersion compensating optical fiber 12 is minimum near a wavelength band of 1,500 to 1,650 nm. On the other hand, the actual loss value $\alpha_1(\lambda)$ of the dispersion compensating optical fiber 12 almost matches the theoretical loss value $\alpha_0(\lambda)$ near a wavelength of 1,520 to 1,620 nm. Hence, a wavelength band of 1,520 to 1,620 nm is used as a signal wavelength band for an optical transmission system. Referring to FIG. 16, the actual loss value $\alpha_1(\lambda)$ is larger than the theoretical loss value $\alpha_0(\lambda)$ near a wavelength of 1,380 nm due to the hydroxyl group and also larger than the theoretical loss value $\alpha_0(\lambda)$ near a wavelength of 1,630 nm.

FIG. 18 is a graph showing the logarithm log ($\Delta\alpha(\lambda)$) of the difference $\Delta\alpha(\lambda)$ between the actual loss value $\alpha_1(\lambda)$ and the theoretical loss value $\alpha_0(\lambda)$. As shown in this graph, the logarithm log ($\Delta\alpha(\lambda)$) and the wavelength $\lambda$ have an almost linear relationship when the wavelength is 1,630 nm or more. The leading wavelength as the minimum wavelength corresponding to a logarithm log ($\Delta\alpha(\lambda)$) of –2 or more (i.e., the value $\Delta\alpha(\lambda)$ is 10 mdB/km or more) in the use wavelength band and on the long wavelength side of the use wavelength band is 1,637 nm. As the characteristics of this dispersion compensating optical fiber 12, the transmission loss is 0.256 dB/km, the dispersion value is –41.76 ps/nm/km, the dispersion slope is –0.0741 ps/nm²/km, the mode field diameter (MFD) is 5.1 μm, the effective area $A_{eff}$ is 19.5 μm², and the bending loss (20φ) is 0.7 dB/m.

Figure 19:
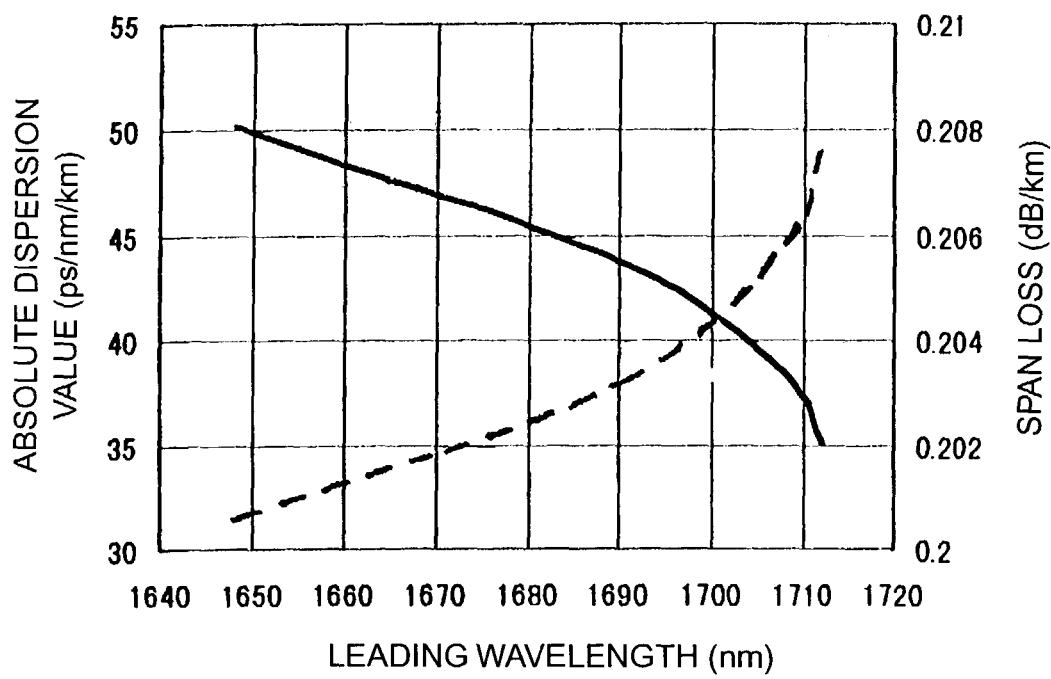
FIG. 19 is a graph showing the absolute dispersion value and span loss with respect to the leading wavelength of the dispersion compensating optical fiber.
Figure 20:
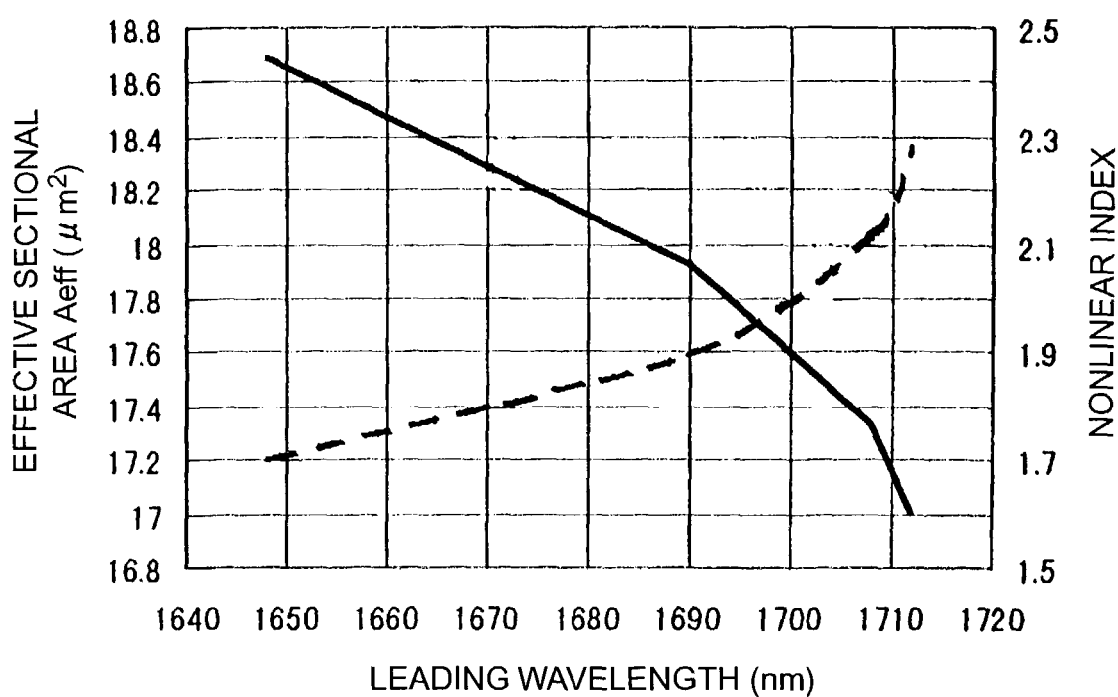
FIG. 20 is a graph showing the effective area and nonlinear index with respect to the leading wavelength of the dispersion compensating optical fiber.

FIG. 19 is a graph showing the absolute dispersion value (indicated by the solid line) and span loss (indicated by the broken line) with respect to the leading wavelength of the dispersion compensating optical fiber 12. FIG. 20 is a graph showing the effective area (indicated by the solid line) and nonlinear index (indicated by the broken line) with respect to the leading wavelength of the dispersion compensating optical fiber 12. The absolute dispersion value and effective area are values in the dispersion compensating optical fiber 12 at a wavelength of 1,550 nm. The span loss and nonlinear index are values in the optical transmission line at the wavelength of 1,550 nm. Assume that the relative refractive index difference $\Delta^+$ of the core region 31 to the second cladding region 33 of the dispersion compensating optical fiber 12 is +1.64%, and the relative refractive index difference $\Delta^-$ of the first cladding region 32 to the second cladding region 33 is –0.36%.

Additionally, assume that the core region 31 of the dispersion compensating optical fiber 12 has the square of an index distribution ($\beta=2$ in equation (10)), and the dispersion slope compensating ratio $\eta$ of the optical transmission line 1 is 40%.

As is apparent from the graphs of FIGS. 19 and 20, when the leading wavelength of the dispersion compensating optical fiber 12 is long, both the average transmission loss (span loss) of the entire optical transmission line 1 and the nonlinear index undesirably increase. To reduce both the transmission loss and nonlinear index of the optical transmission line 1, the leading wavelength of the dispersion compensating optical fiber 12 must have a predetermined value or less. When the fact that the nonlinear index $\Delta\phi$ of the dispersion shift optical fiber (NZ-DSF) having a zero dispersion wavelength on the long wavelength side of 1,550 nm is 2.1 is taken into consideration, the upper limit of the preferable range of the leading wavelength of the dispersion compensating optical fiber 12 is 1,700 nm. Assume that the leading wavelength of the dispersion compensating optical fiber 12 is included in the use wavelength band. In this case, in the range equal to or larger than the leading wavelength of the use wavelength band, the actual loss value $\alpha_1(\lambda)$ of the dispersion compensating optical fiber 12 undesirably increases. Hence, the lower limit of the preferable range of the leading wavelength of the dispersion compensating optical fiber 12 matches the upper limit of the use wavelength band.

If the use wavelength band is the C band (1,520 to 1,565 nm), the leading wavelength of the dispersion compensating optical fiber 12 preferably falls within the range of 1,565 to 1,700 nm. If the use wavelength band includes not only the C band but also the L band (1,565 to 1,620 nm), the leading wavelength of the dispersion compensating optical fiber 12 preferably falls within the range of 1,620 to 1,700 nm. When the leading wavelength of the dispersion compensating optical fiber 12 is present in this preferable range, the transmission loss of the dispersion compensating optical fiber 12 becomes sufficiently small in the use wavelength band. In addition, both the transmission loss and nonlinear index of the optical transmission line 1 formed by connecting the single-mode optical fiber 11 and dispersion compensating optical fiber 12 also become sufficiently small.

As described above, the dispersion compensating optical fiber 12 according to this embodiment is preferably connected to the single-mode optical fiber 11 to construct the optical transmission line 1. An optical transmission system having this optical transmission line 1 requires a small number of optical amplifiers for amplifying an optical signal, resulting in low cost. In addition, since the transmission loss is small, the input power can be reduced. Furthermore, since the nonlinear index of the entire optical transmission line 1 can be suppressed sufficiently small, the nonlinear optical phenomenon hardly occurs, and the optical transmission line can be suitably used for long-distance large-capacity transmission.

Here, the actual loss value $\alpha_1(\lambda)$ of the dispersion compensating optical fiber 12 according to this embodiment is measured in a state that the fiber 12 is looped around a bobbin, or in a state that the fiber 12 is comprised in an optical cable, or in a state that the fiber 12 is comprised in an optical module.

As the first measurement example, the leading wavelength of the dispersion compensating optical fiber 12 with the dispersion of –40 ps/nm/km, the dispersion slope of –0.12 ps/nm²/km, the relative dispersion slope (the ratio of the dispersion slope to the dispersion) of 0.003 nm⁻¹, and the effective area $A_{eff}$ of 28 μm², at a wavelength of 1,550 nm is measured.

Figure 21A:
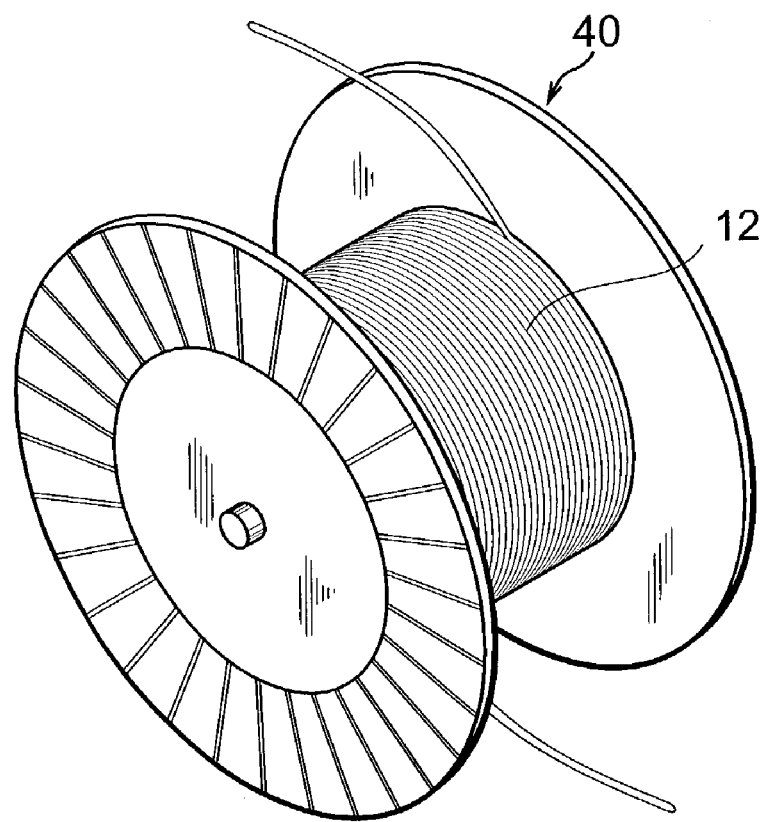
FIG. 21A is a perspective view showing the dispersion compensating optical fiber looped around the bobbin.
Figure 21B:
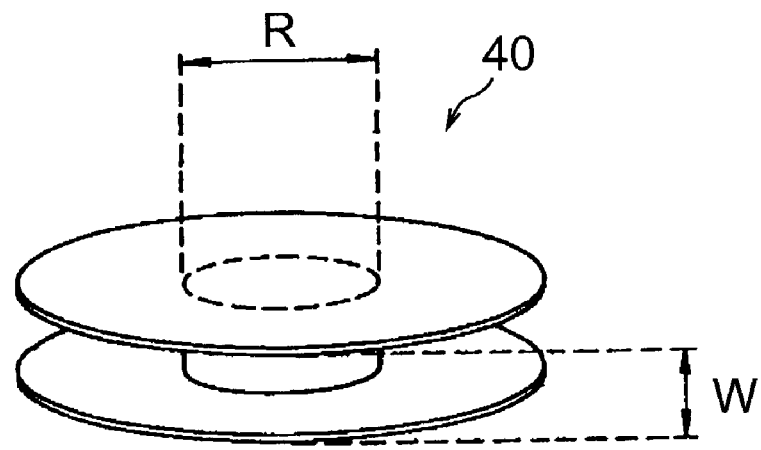
FIG. 21B is a view for explaining the size of the bobbin shown in FIG. 21A.
Figure 22:
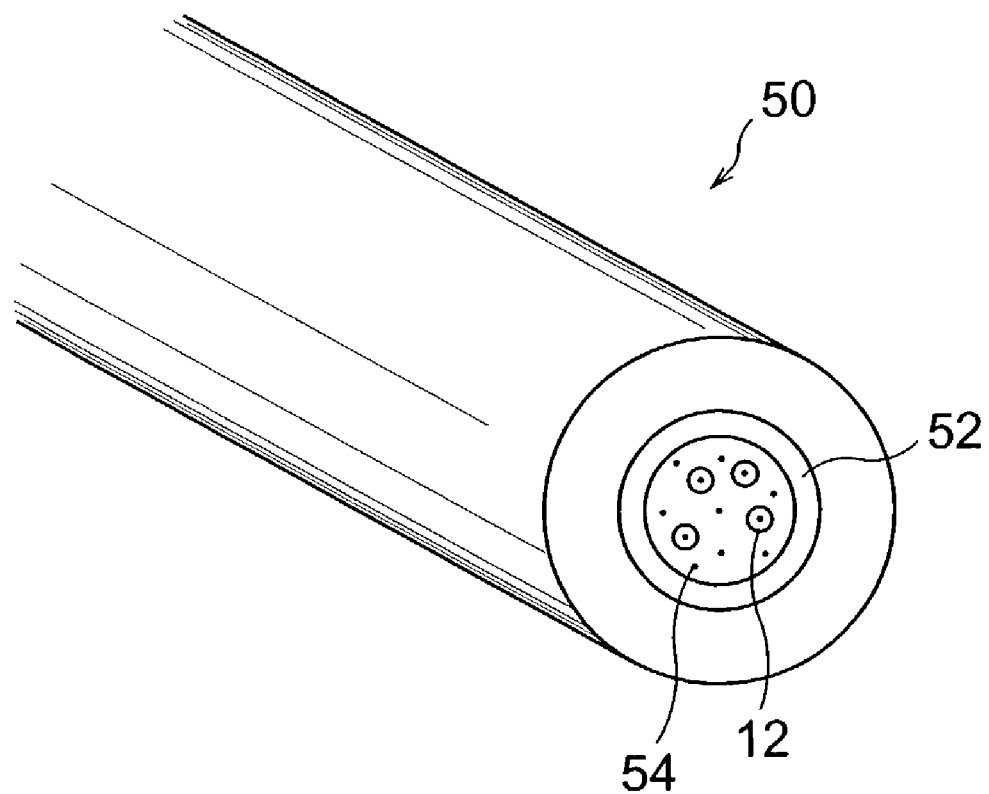
FIG. 22 is a perspective view showing the optical cable comprising the dispersion compensating optical fiber.

The actual loss value $\alpha_1(\lambda)$ is measured in a state that the dispersion compensating optical fiber 12 is looped around a flanged bobbin 40 with the barrel diameter R of 280 mm and the barrel width W of 300 mm under tension of 50 g shown in FIGS. 21A and 21B, and the leading wavelength measured in this case is 1,600 nm. Furthermore, the actual loss value $\alpha_1(\lambda)$ is measured in a state that the dispersion compensating optical fiber 12 is comprised in an optical cable 50 shown in FIG. 22. The fiber 12 is loosely housed in a tube 52 filled with gel material 54. The leading wavelength measured in this case is 1,640 nm.

Such a dispersion compensating optical fiber 12 is preferable for forming an optical transmission line by being optically connected to an optical fiber with positive dispersion at a use wavelength. The relative dispersion slope of the fiber 12 at a wavelength of 1,550 nm is preferably 0.0023 to 0.0043 nm⁻¹ and the dispersion value at a wavelength of 1,550 nm is preferably –82 to –29 ps/nm/km like the fiber explained in the above first measurement example.

As the second measurement example, the leading wavelength of the dispersion compensating optical fiber 12 with the dispersion of –80 ps/nm/km, the dispersion slope of −0.80 ps/nm²/km, the relative dispersion slope of 0.010 nm⁻¹, and the effective area $A_{eff}$ of 17 μm², at a wavelength of 1,550 nm is measured.

Figure 23A:
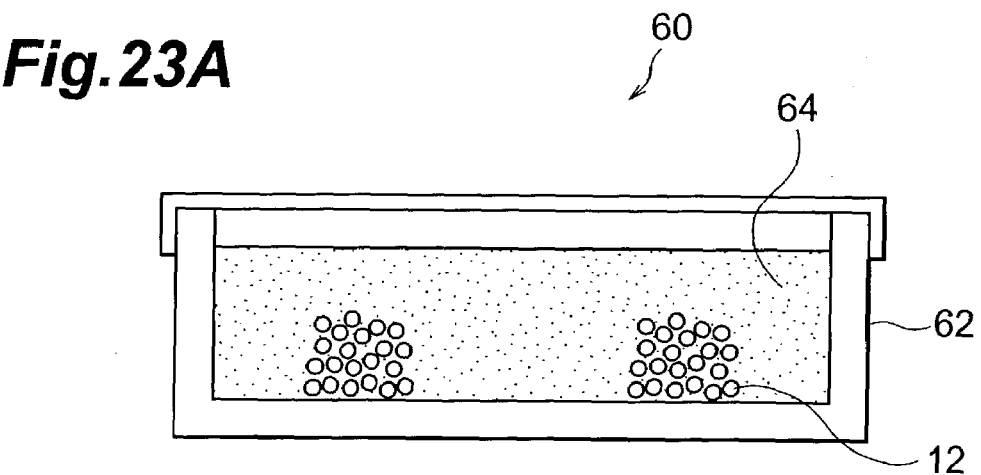
FIG. 23A is a sectional view showing the dispersion compensating module comprising the dispersion compensating optical fiber.
Figure 23B:
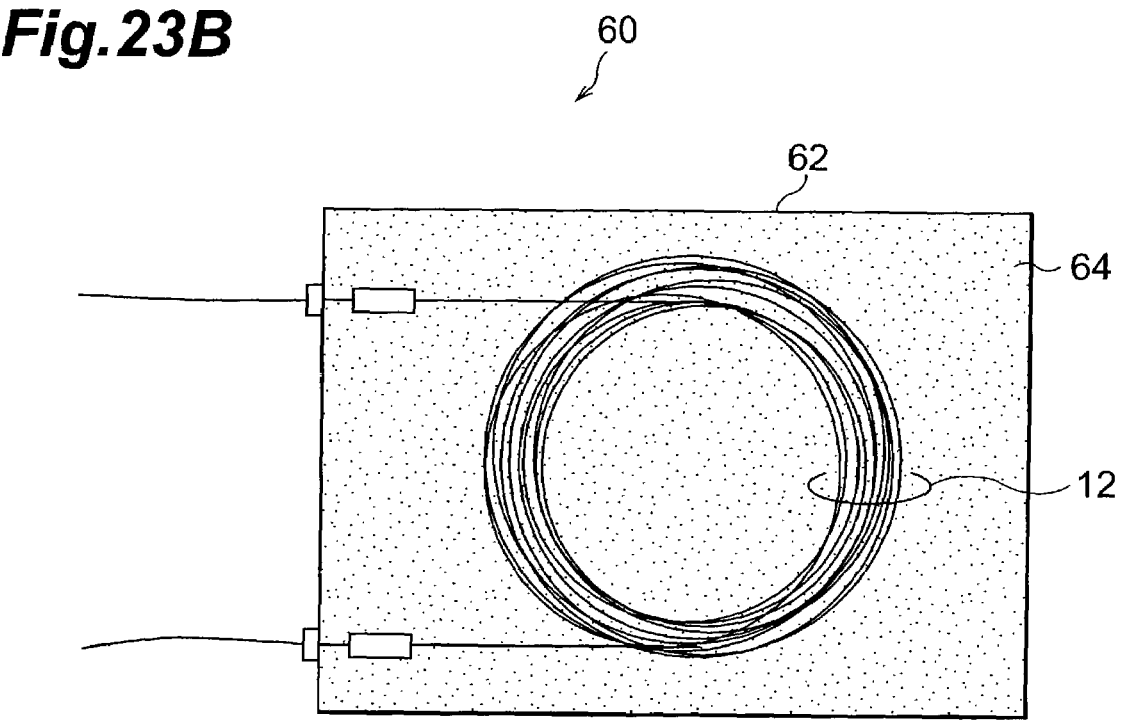
FIG. 23B is a plane view showing the dispersion compensating module shown in FIG. 23A.

The actual loss value $\alpha_1(\lambda)$ is measured in a state that the dispersion compensating optical fiber 12 is looped around a flanged bobbin 40 with the barrel diameter R of 170 mm and the barrel width W of 100 mm under tension of 40 g shown in FIGS. 21A and 21B, and the leading wavelength measured in this case is 1,570 nm. Furthermore, the actual loss value $\alpha_1(\lambda)$ is measured in a state that the dispersion compensating optical fiber 12 is comprised in a dispersion compensating module 60 shown in FIGS. 23A and 23B. The fiber 12 is loosely housed in a case 62 filled with gel material 64. The leading wavelength measured in this case is 1,610 nm.

Such a dispersion compensating optical fiber 12 is preferable for forming an optical transmission line by being optically connected to an optical fiber with positive dispersion at a use wavelength. The relative dispersion slope of the fiber 12 at a wavelength of 1,550 nm is preferably not less than 0.006 nm⁻¹ and the dispersion value at a wavelength of 1,550 nm is preferably −82 to −29 ps/nm/km like the fiber explained in the above second measurement example.

Figure 24A:
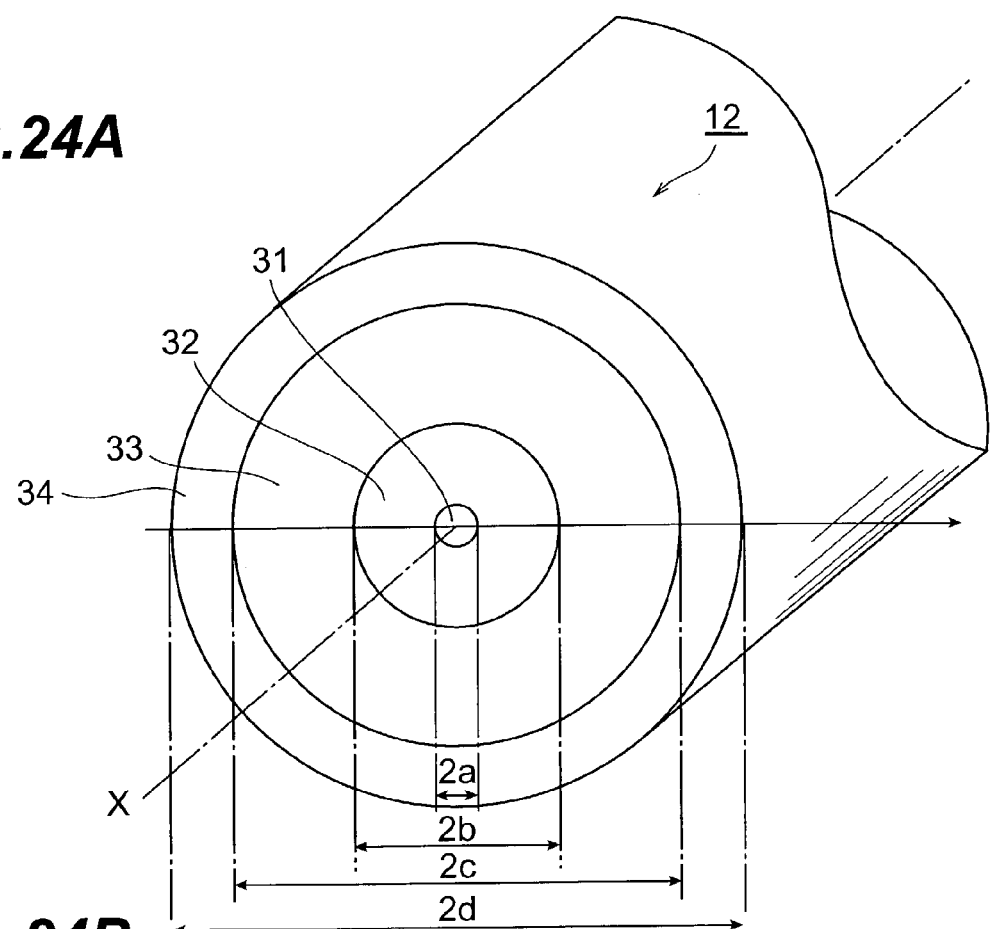
FIG. 24A is a sectional view schematically showing another structure of the dispersion compensating optical fiber according to this embodiment.
Figure 24B:
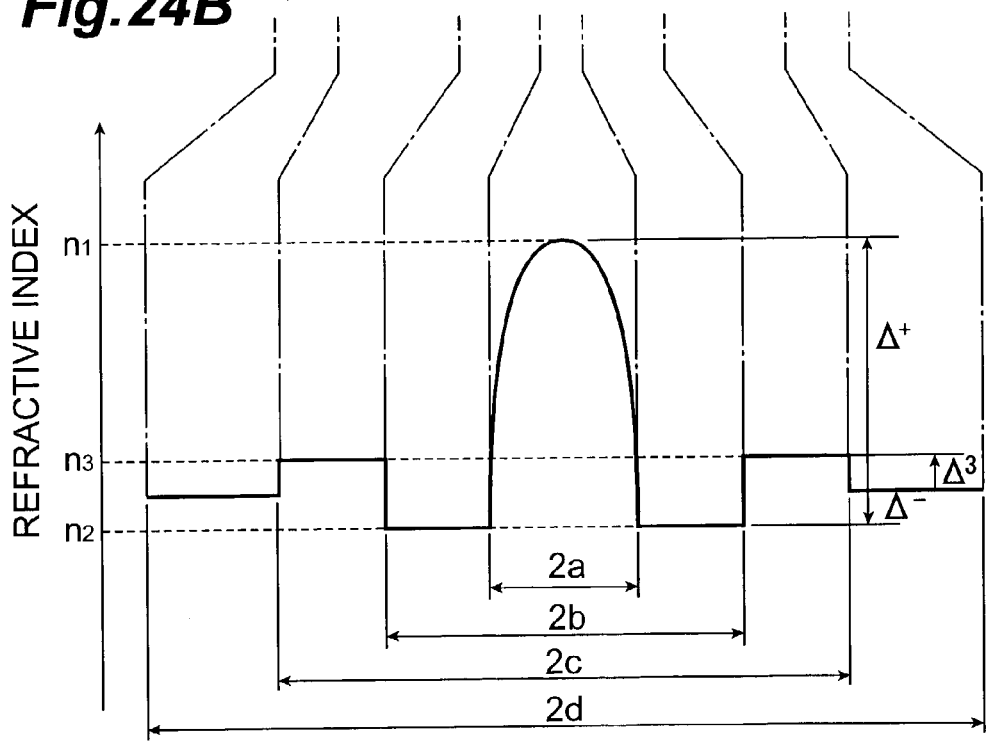
FIG. 24B is a view showing the refractive index profile of the dispersion compensating optical fiber shown in FIG. 24A.

The refractive index profile of the dispersion compensating optical fiber 12 according to this embodiment is not limited to that shown in FIGS. 3A and 3B. FIG. 24A is a sectional view schematically showing another structure of the dispersion compensating optical fiber 12 according to this embodiment. FIG. 24B is a view showing the refractive index profile of the dispersion compensating optical fiber 12. As shown in FIGS. 24A and 24B, the dispersion compensating optical fiber 12 may have the core region 31 including the optical axis center X and having the refractive index $n_1$, the first cladding region 32 surrounding the core region 31 and having the refractive index $n_2$, the second cladding region 33 surrounding the first cladding region 32 and having the refractive index $n_3$, and a third cladding region 34 surrounding the second cladding region 33 and having a refractive index $n_4$. A relationship $n_1 > n_3 > n_4 > n_2$ holds between the refractive indices. The dispersion compensating optical fiber 12 with such a structure can be implemented using silica glass as a base by, e.g., doping appropriate doses of $GeO_2$ in the core region 31 and second cladding region 33, and F in the first cladding region 32. In the dispersion compensating optical fiber 12 having this refractive index profile as well, the dispersion value $D_{DCF}$ and dispersion slope $S_{DCF}$ at the wavelength of 1,550 nm can satisfy equations (3a) and (3b).

The relative refractive index difference $\Delta^+$ of the core region 31 to the third cladding region 34 is preferably 1.3% to 1.7%, and the relative refractive index difference $\Delta^-$ of the first cladding region 32 to the third cladding region 34 is preferably −0.5% to −0.2%.

The relative refractive index difference $\Delta^+$ of the core region 31 to the third cladding region 34 and the relative refractive index difference $\Delta^-$ of the first cladding region 32 to the third cladding region 34 are defined by $$\Delta^+ = (n_1 - n_4)/n_4$$

$$\Delta^- = (n_2 - n_4)/n_4$$

where $n_1$ is the refractive index of the core region 31, $n_2$ is the refractive index of the first cladding region 32, and $n_4$ is the refractive index of the third cladding region 34. In this specification, the relative refractive index difference is represented in percentage, and the refractive indices of the respective regions in the above definitions are not in order. Hence, when the relative refractive index difference has a negative value, the corresponding region has a refractive index lower than that of the third cladding region 34.

Detailed examples of the dispersion compensating optical fiber 12 of this embodiment will be described next. Each of the first to fifth examples of the dispersion compensating optical fiber 12 has the refractive index profile shown in FIGS. 3A and 3B. Each of the sixth to eighth examples of the dispersion compensating optical fiber 12 has the refractive index profile shown in FIGS. 24A and 24B.

The first example of the dispersion compensating optical fiber 12 has the refractive index profile shown in FIGS. 3A and 3B. The diameter 2a of the core region 31 is 4.34 μm, the outer diameter 2b of the first cladding region 32 is 9.24 μm, the outer diameter 2c of the second cladding region 33 is 125 μm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −35.5 ps/nm/km, and the dispersion slope $S_{DCF}$ is −0.076 ps/nm²/km, which satisfy equations (3a) and (3b). At the wavelength of 1,550 nm, the effective area $A_{eff}$ of this dispersion compensating optical fiber 12 is 19.66 μm², the nonlinear refractive index $n_{NL}$ is $3.83 \times 10^{-20}$ m²/W, and the transmission loss is 0.27 dB/km.

The second example of the dispersion compensating optical fiber 12 has the refractive index profile shown in FIGS. 3A and 3B. The diameter 2a of the core region 31 is 3.30 μm, the outer diameter 2b of the first cladding region 32 is 8.24 μm, the outer diameter 2c of the second cladding region 33 is 125 μm, the relative refractive index difference $\Delta^+$ of the core region 31 is +1.70%, and the relative refractive index difference $\Delta^-$ of the first cladding region 32 is −0.36%. At the wavelength of 1,550 nm, the dispersion value $D_{DCF}$ of this dispersion compensating optical fiber 12 is −68.2 ps/nm/km, and the dispersion slope $S_{DCF}$ is −0.145 ps/nm²/km, which satisfy equations (3a) and (3b). At the wavelength of 1,550 nm, the effective area $A_{eff}$ of this dispersion compensating optical fiber 12 is 16.31 μm², the nonlinear refractive index $n_{NL}$ is $4.13 \times 10^{-20}$ m²/W, and the transmission loss is 0.35 dB/km.

The third example of the dispersion compensating optical fiber 12 has the refractive index profile shown in FIGS. 3A and 3B. The diameter 2a of the core region 31 is 4.35 μm, the outer diameter 2b of the first cladding region 32 is 8.20 μm, the outer diameter 2c of the second cladding region 33 is 125 μm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −39.2 ps/nm/km, and the dispersion slope $S_{DCF}$ is −0.060 ps/nm²/km, which satisfy equations (3a) and (3b) At the wavelength of 1,550 nm, the effective area $A_{eff}$ of this dispersion compensating optical fiber 12 is 20.63 μm², the nonlinear refractive index $n_{NL}$ is $3.82 \times 10^{-20}$ m²/W, and the transmission loss is 0.27 dB/km.

The fourth example of the dispersion compensating optical fiber 12 has the refractive index profile shown in FIGS. 3A and 3B. The diameter 2a of the core region 31 is 3.29 μm, the outer diameter 2b of the first cladding region 32 is 7.32 μm, the outer diameter 2c of the second cladding region 33 is 125 μm, the relative refractive index difference $\Delta^+$ of the core region 31 is +1.70%, and the relative refractive index difference $\Delta^-$ of the first cladding region 32 is −0.36%. At the wavelength of 1,550 nm, the dispersion value $D_{DCF}$ of this dispersion compensating optical fiber 12 is −71.8 ps/nm/km, and the dispersion slope $S_{DCF}$ is −0.109 ps/nm²/km, which satisfy equations (3a) and (3b). At the wavelength of 1,550 nm, the effective area $A_{eff}$ of this dispersion compensating optical fiber 12 is 17.16 µm², the nonlinear refractive index $n_{NL}$ is 4.14×10⁻²⁰ m²/W, and the transmission loss is 0.35 dB/km.

The fifth example of the dispersion compensating optical fiber 12 has the refractive index profile shown in FIGS. 3A and 3B. The diameter 2a of the core region 31 is 4.35 µm, the outer diameter 2b of the first cladding region 32 is 7.50 µm, the outer diameter 2c of the second cladding region 33 is 125 µm, the relative refractive index difference $\Delta^+$ of the core region 31 is +1.35%, and the relative refractive index difference $\Delta^-$ of the first cladding region 32 is −0.36%. At the wavelength of 1,550 nm, the dispersion value $D_{DCF}$ of this dispersion compensating optical fiber 12 is −40.0 ps/nm/km, and the dispersion slope $S_{DCF}$ is −0.0366 ps/nm²/km, which satisfy equations (3a) and (3b). At the wavelength of 1,550 nm, the effective area $A_{eff}$ of this dispersion compensating optical fiber 12 is 21.45 µm², the nonlinear refractive index $n_{NL}$ is 3.82×10⁻²⁰ m²/W, and the transmission loss is 0.27 dB/km.

The sixth example of the dispersion compensating optical fiber 12 has the refractive index profile shown in FIGS. 24A and 24B. The diameter 2a of the core region 31 is 4.44 µm, the outer diameter 2b of the first cladding region 32 is 8.88 µm, an outer diameter 2c of the second cladding region 33 is 14.80 µm, the outer diameter 2d of the third cladding region 34 is 125 µm, the relative refractive index difference $\Delta^+$ of the core region 31 is +1.50%, the relative refractive index difference $\Delta^-$ of the first cladding region 32 is −0.37%, and the relative refractive index difference $\Delta_3$ of the second cladding region 33 is +0.20%. At the wavelength of 1,550 nm, the dispersion value $D_{DCF}$ of this dispersion compensating optical fiber 12 is −57.94 ps/nm/km, and the dispersion slope $S_{DCF}$ is −0.106 ps/nm²/km, which satisfy equations (3a) and (3b). At the wavelength of 1,550 nm, the effective area $A_{eff}$ of this dispersion compensating optical fiber 12 is 21.59 µm², the nonlinear refractive index $n_{NL}$ is 3.88×10⁻²⁰ m²/W, and the transmission loss is 0.3 dB/km.

The seventh example of the dispersion compensating optical fiber 12 has the refractive index profile shown in FIGS. 24A and 24B. The diameter 2a of the core region 31 is 5.41 µm, the outer diameter 2b of the first cladding region 32 is 8.20 µm, the outer diameter 2c of the second cladding region 33 is 16.40 µm, the outer diameter 2d of the third cladding region 34 is 125 µm, the relative refractive index difference $\Delta^+$ of the core region 31 is +1.35%, the relative refractive index difference $\Delta^-$ of the first cladding region 32 is −0.50%, and the relative refractive index difference $\Delta_3$ of the second cladding region 33 is +0.20%. At the wavelength of 1,550 nm, the dispersion value $D_{DCF}$ of this dispersion compensating optical fiber 12 is −38.14 ps/nm/km, and the dispersion slope $S_{DCF}$ is −0.066 ps/nm²/km, which satisfy equations (3a) and (3b). At the wavelength of 1,550 nm, the effective area $A_{eff}$ of this dispersion compensating optical fiber 12 is 22.51 µm², the nonlinear refractive index $n_{NL}$ is 3.83×10⁻²⁰ m²/W, and the transmission loss is 0.3 dB/km.

The eighth example of the dispersion compensating optical fiber 12 has the refractive index profile shown in FIGS. 24A and 24B. The diameter 2a of the core region 31 is 3.70 µm, the outer diameter 2b of the first cladding region 32 is 11.40 µm, the outer diameter 2c of the second cladding region 33 is 14.80 µm, the outer diameter 2d of the third cladding region 34 is 125 µm, the relative refractive index difference $\Delta^+$ of the core region 31 is +1.65%, the relative refractive index difference $\Delta^-$ of the first cladding region 32 is −0.20%, and the relative refractive index difference $\Delta_3$ of the second cladding region 33 is +0.40%. At the wavelength of 1,550 nm, the dispersion value $D_{DCF}$ of this dispersion compensating optical fiber 12 is −76.68 ps/nm/km, and the dispersion slope $S_{DCF}$ is −0.094 ps/nm²/km, which satisfy equations (3a) and (3b). At the wavelength of 1,550 nm, the effective area $A_{eff}$ of this dispersion compensating optical fiber 12 is 24.27 µm², the nonlinear refractive index $n_{NL}$ is 3.90×10⁻²⁰ m²/W, and the transmission loss is 0.33 dB/km.

The dispersion compensating optical fiber 12 according to this embodiment is connected, at an appropriate length ratio, to the single-mode optical fiber 11 having a zero dispersion wavelength in the 1.3-µm band and positive dispersion at the wavelength of 1,550 nm to form the optical transmission line 1 which reduces both the transmission loss and nonlinear index.

Since the optical transmission line 1 having this arrangement has a low refractive index and low nonlinear index, the nonlinear optical phenomenon is suppressed. Hence, the optical transmission line is suitable to long-distance large-capacity transmission.

Next, an optical transmission line of other embodiment will be described below.

Figure 25:
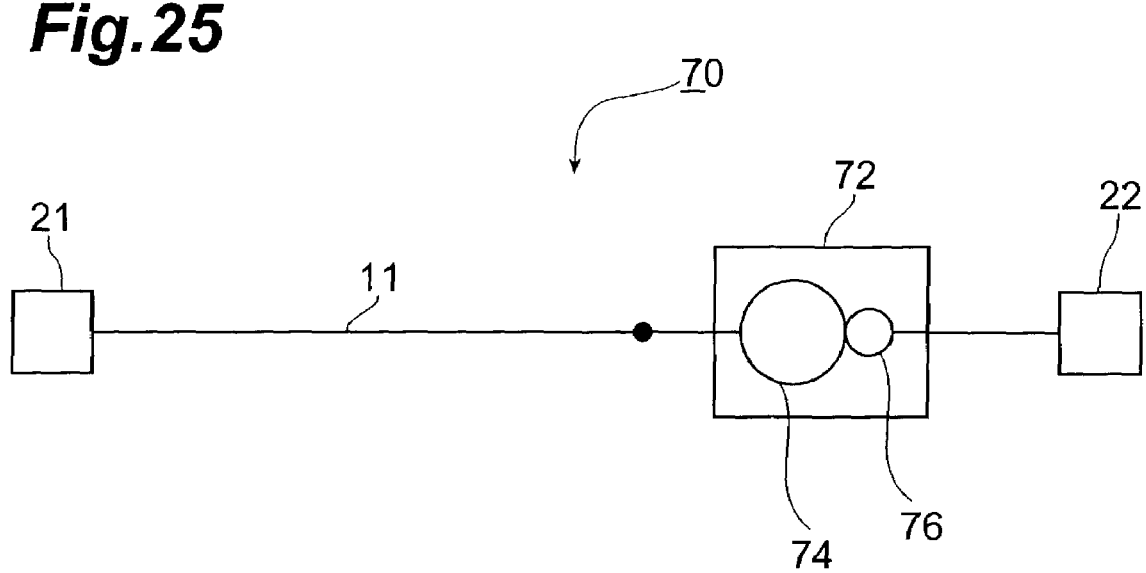
FIG. 25 is a view showing the arrangement of an optical transmission line and an optical transmission system according to another embodiment.

FIG. 25 is a view showing the arrangement of an optical transmission line 70 according to this embodiment. The optical transmission line 70 of this embodiment is formed by connecting an upstream single-mode optical fiber (SMF) 11 to a downstream dispersion compensating device 72, and provided between a repeater 21 and a repeater 22, thus an optical transmission system is constructed. At least one of the repeaters 21 and 22 may be a station. The single-mode optical fiber 11 has positive dispersion and positive dispersion slope at a wavelength of 1,550 nm.

The dispersion compensating device 72 is formed by fusion-splicing and optically connecting a plurality of optical fibers. The dispersion compensating device 72 has negative dispersion and a negative dispersion slope at the wavelength of 1,550 nm. At least one of a plurality of optical fibers is a dispersion compensating optical fiber. In this embodiment, the dispersion compensating device 72 is constructed by optically connecting one dispersion compensating optical fiber 74 and one single-mode optical fiber 76. The dispersion compensating device 72 can be comprised in an optical module.

A wavelength-multiplexed optical signal in the 1.55-µm wavelength band, which is output from the repeater 21 sequentially propagates through the single-mode optical fiber 11 and dispersion compensating device 72 and reaches the repeater 22.

In the dispersion compensating device 72 according to this embodiment, the leading wavelength of the optically connected optical fibers 74, 76 as a whole preferably falls within the range of 1,565 to 1,700 nm and, more preferably, 1,620 to 1,700 nm Further, in the dispersion compensating device 72 according to this embodiment, relative dispersion slope (RDS: dispersion slope/dispersion) is not less than 0.006 nm⁻¹. Such a large relative dispersion slope can be obtained since the dispersion compensating device 72 of this embodiment is constructed by optically connecting a plurality of optical fibers.

When a dispersion compensating device 72 according to this embodiment is used with a single-mode optical fiber having positive dispersion and positive dispersion slope at a wavelength of 1,550 nm, an optical transmission line 70 which has sufficiently small transmission loss and nonlinear index can be formed. If the use wavelength band is the C band (1,520 to 1,565 nm), the leading wavelength of the dispersion compensating device 72 preferably falls within the range of 1,565 to 1,700 nm. If the use wavelength band includes not only the C band but also the L band (1,565 to 1,620 nm), the leading wavelength of the dispersion compensating device 72 preferably falls within the range of 1,620 to 1,700 nm.

Here, the actual loss value $\alpha_1(\lambda)$ of the dispersion compensating device 72 according to this embodiment is measured in a state that the device 72 is comprised in an optical module. As a measurement example, the leading wavelength of the dispersion compensating device 72 is measured. The device 72 is formed by connecting the dispersion compensating optical fiber with the dispersion of −60 ps/nm/km, the dispersion slope of −0.80 ps/nm²/km, and the effective area $A_{eff}$ of 18 μm, at a wavelength of 1,550 nm and a single-mode optical fiber with the dispersion of +17 ps/nm/km, the dispersion slope of +0.06 ps/nm²/km, and the effective area $A_{eff}$ of 85 μm, at a wavelength of 1,550 nm. The ratio of the length of the dispersion compensating optical fiber to the length of the single-mode optical fiber is 2/3. The average dispersion of the overall fibers is −13.8 ps/nm/km, the average dispersion slope of the overall fibers is −0.284 ps/nm²/km, and the average relative dispersion slope of the overall fibers is 0.02 nm⁻¹ at a wavelength of 1,550 nm.

Figure 26A:
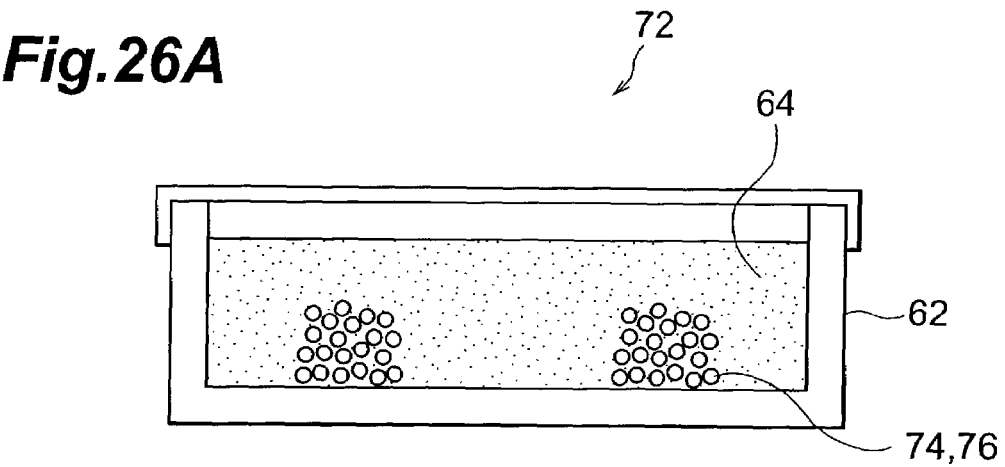
FIG. 26A is a sectional view showing a dispersion compensating device according to an embodiment.
Figure 26B:
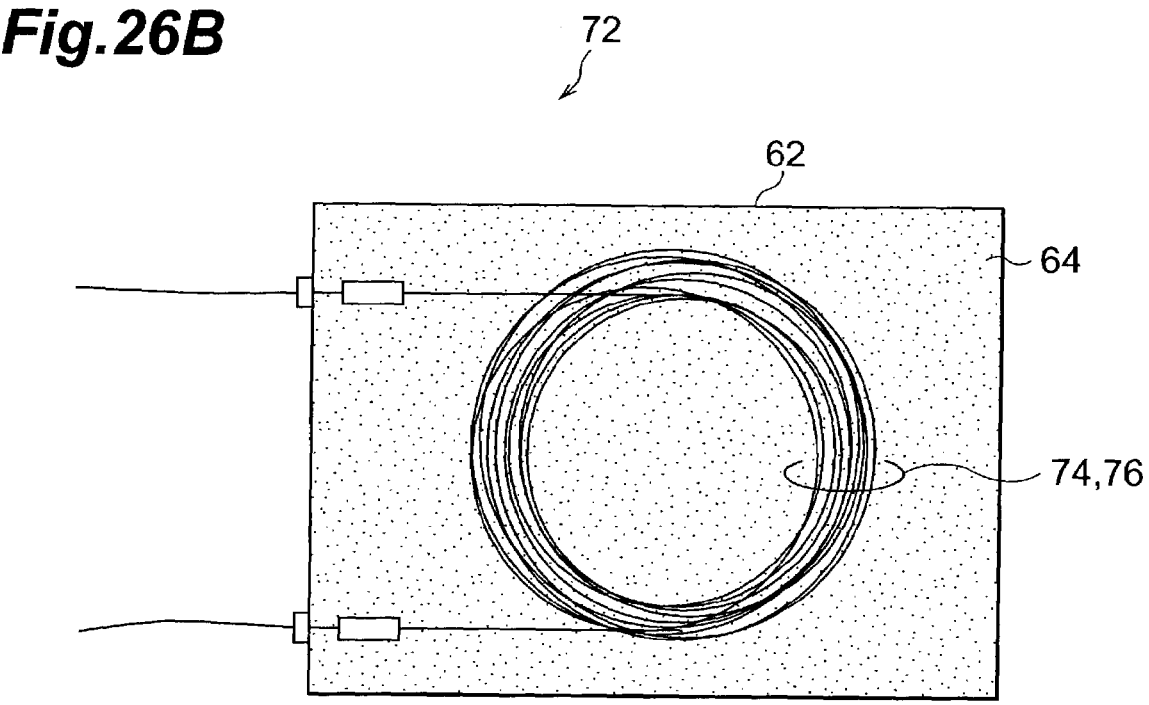
FIG. 26B is a plane view showing the dispersion compensating device shown in FIG. 26A

The actual loss value $\alpha_1(\lambda)$ is measured in a state that the optical fibers 74, 76 is comprised in an optical module shown in FIGS. 26A and 26B. The fibers 74, 76 is loosely housed in a case 62 filled with gel material 64. The leading wavelength measured in this case is 1,590 nm.

Such a dispersion compensating device 72 is preferable for forming an optical transmission line by being optically connected to an optical fiber with positive dispersion at a use wavelength.

As is apparent from the above description of the present invention, various changes and modifications can be made without departing from the spirit and scope of the present invention, and improvements which are obvious to those skilled in the art are incorporated in the appended claims.

What is claimed is:

1. A dispersion compensating optical fiber comprising:
a core; and
a cladding surrounding said core; wherein:
said core and said cladding are arranged so as to obtain negative dispersion at 1550 nm; and
when said dispersion compensating optical fiber is employed in an optical transmission system and a particular use wavelength band is used as a signal wavelength band, said dispersion compensating optical fiber exhibits such loss characteristic that a minimum wavelength at which a difference between an actual loss value $\alpha_1(\lambda)$ and a theoretical loss value $\alpha_0(\lambda)$ is not less than 10 mdB/km in the use wavelength band and on a long wavelength side of the use wavelength band falls within a range of 1,565 to 1,700 nm,
wherein said actual loss value $\alpha_1(\lambda)$ is measured in a state that the fiber is looped around a bobbin, and
wherein the theoretical loss value $\alpha_0(\lambda)$ of the fiber is obtained by the following equation, $$\alpha_0(\lambda) = A/\lambda^4 + B + 6.65 \times 10^{12} \cdot \exp(-52.67/\lambda)$$

where λ [unit: μm] is a wavelength of an optical signal, A is the Rayleigh scattering coefficient, and B is a constant representing a loss due to structure mismatching.

2. A dispersion compensating optical fiber comprising:
a core; and
a cladding surrounding said core; wherein:
said core and said cladding are arranged so as to obtain negative dispersion at 1,550 nm; and
when said dispersion compensating optical fiber is employed in an optical transmission system and a particular use wavelength band is used as a signal wavelength band, said dispersion compensating optical fiber exhibits such loss characteristics that a minimum wavelength at which a difference between an actual loss value $\alpha_1(\lambda)$ and a theoretical loss value $\alpha_0(\lambda)$ is not less than 10 mdB/km in a use wavelength band and on a long wavelength side of the use wavelength band falls within a range of 1,565 to 1,700 nm,
wherein said actual loss value $\alpha_1(\lambda)$ is measured in a state that the fiber is comprised in an optical module, and
wherein the theoretical loss value $\alpha_0(\lambda)$ of the fiber is obtained by the following equation, $$\alpha_0(\lambda) = A/\lambda^4 + B + 6.65 \times 10^{12} \cdot \exp(-52.67/\lambda)$$

where λ [unit: μm] is a wavelength of an optical signal, A is the Rayleigh scattering coefficient, and B is a constant representing a loss due to structure mismatching.

3. A dispersion compensating optical fiber comprising:
a core; and
a cladding surrounding said core; wherein:
said core and said cladding are arranged so as to obtain negative dispersion at 1,550 nm; and
when said dispersion compensating optical fiber is employed in an optical transmission system and a particular use wavelength band is used as a signal wavelength band, said dispersion compensating optical fiber exhibits such loss characteristics that a minimum wavelength at which a difference between an actual loss value $\alpha_1(\lambda)$ and a theoretical loss value $\alpha_0(\lambda)$ is not less than 10 mdB/km in a use wavelength band and on a long wavelength side of the use wavelength band falls within a range of 1,565 to 1,700 nm,
wherein said actual loss value $\alpha_1(\lambda)$ is measured in a state that the fiber is comprised in an optical cable, and
wherein the theoretical loss value $\alpha_0(\lambda)$ of the fiber is obtained by the following equation, $$\alpha_0(\lambda) = A/\lambda^4 + B + 6.65 \times 10^{12} \cdot \exp(-52.67/\lambda)$$

where λ [unit: μm] is a wavelength of an optical signal, A is the Rayleigh scattering coefficient, and B is a constant representing a loss due to structure mismatching.

4. A dispersion compensating optical fiber comprising:
a core; and
a cladding surrounding said core; wherein:
relative dispersion slope is 0.0023 to 0.0043 nm⁻¹ at a wavelength of 1,550 nm;
said core and said cladding are arranged so as to obtain negative dispersion at 1,550 nm; and
when said dispersion compensating optical fiber is employed in an optical transmission system and a particular use wavelength band is used as a signal wavelength band, said dispersion compensating optical fiber exhibits such loss characteristics that a minimum wavelength at which a difference between an actual loss value $\alpha_1(\lambda)$ and a theoretical loss value $\alpha_0(\lambda)$ is not less than 10 mdB/km in a use wavelength band and on a long wavelength side of the use wavelength band falls within a range of 1,565 to 1,700 nm, and
wherein the theoretical loss value $\alpha_0(\lambda)$ of the fiber is obtained by the following equation, $$\alpha_0(\lambda) = A/\lambda^4 + B + 6.65 \times 10^{12 \cdot exp}(-52.67/\lambda)$$

where λ [unit: μm] is a wavelength of an optical signal, A is the Rayleigh scattering coefficient, and B is a constant representing a loss due to structure mismatching.

5. A fiber according to claim 4, wherein said actual loss value is measured in a state that the fiber is looped around a bobbin or in a state that the fiber is comprised in an optical cable.

6. A fiber according to claim 5, wherein a dispersion value at a wavelength of 1,550 nm is −82 to −29 ps/nm/km.

7. A dispersion compensating optical fiber comprising:
a core; and
a cladding surrounding said core; wherein:
relative dispersion slope is not less than 0.006 nm$^{-1}$ at a wavelength of 1,550 nm;
said core and said cladding are arranged so as to obtain negative dispersion at 1,550 nm; and
when said dispersion compensating optical fiber is employed in an optical transmission system and a particular use wavelength band is used as a signal wavelength band, said dispersion compensating optical fiber exhibits such loss characteristics that a minimum wavelength at which a difference between an actual loss value $\alpha_1(\lambda)$ and a theoretical loss value $\alpha_0(\lambda)$ is not less than 10 mdB/km in a use wavelength band and on a long wavelength side of the use wavelength band falls within a range of 1,565 to 1,700 nm, and
wherein the theoretical loss value $\alpha_0(\lambda)$ of the fiber is obtained by the following equation, $$\alpha_0(\lambda)=A/\lambda^4+B+6.65\times10^{12}\cdot\exp(-52.671\lambda)$$

where λ [unit: μm] is a wavelength of an optical signal, A is the Rayleigh scattering coefficient, and B is a constant representing a loss due to structure mismatching.

8. A fiber according to claim 7, wherein said actual loss value is measured in a state that the fiber is looped around a bobbin or in a state that the fiber is comprised in an optical module.

9. A dispersion compensating device comprising:
a plurality of optical fibers having a core and a cladding surrounding said core, said fibers being optically connected; wherein:
at least one of said fibers is a dispersion compensating optical fiber; and
said core and said cladding of said plurality of optical fibers are arranged so as to obtain negative dispersion at 1,550 nm; and
when said dispersion compensating optical fiber is employed in an optical transmission system and a particular use wavelength band is used as a signal wavelength band, said dispersion compensating optical fiber exhibits such loss characteristics that a minimum wavelength at which a difference between an actual loss value $\alpha_1(\lambda)$ of said plurality of optical fibers and a theoretical loss value $\alpha_0(\lambda)$ is not less than 10 mdB/kin in a use wavelength band and on a long wavelength side of the use wavelength band falls within a range of 1,565 to 1,700 nm, and
wherein the theoretical loss value $\alpha_0(\lambda)$ of said plurality of optical fibers is obtained by the following equation, $$\alpha_0(\lambda)=A/\lambda^4+B+6.65\times10^{12}\cdot\exp(-52.67/\lambda)$$

where λ [unit: μm] is a wavelength of an optical signal, A is the Rayleigh scattering coefficient, and B is a constant representing a loss due to structure mismatching.

10. A device according to claim 9, wherein relative dispersion slope at a wavelength of 1,550 nm is not less than 0.006 nm$^{-1}$.

11. A device according to claim 9, wherein said actual loss value is measured in a state that the device is comprised in an optical module.

12. An optical transmission line formed by optically connecting:
a single-mode optical fiber having positive dispersion and positive dispersion slope at a wavelength of 1,550 nm; and
said dispersion compensating optical fiber according to either one of claims 1 through 4 and 7.

13. An optical transmission system comprising said optical transmission line of claim 12.

14. An optical transmission line formed by optically connecting:
a single-mode optical fiber having positive dispersion and positive dispersion slope at a wavelength of 1,550 nm; and
said dispersion compensating device according to claim 9.

15. An optical transmission system comprising said optical transmission line of claim 14.

* * * * *